United States Patent
Wu

(10) Patent No.: US 11,379,255 B2
(45) Date of Patent: Jul. 5, 2022

(54) ACCELERATION CAPACITY ADJUSTMENT METHOD AND APPARATUS FOR ADJUSTING ACCELERATION CAPACITY OF VIRTUAL MACHINE

(71) Applicant: Huawei Technologies Co., Ltd., Shenzhen (CN)

(72) Inventor: Jianbang Wu, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 448 days.

(21) Appl. No.: 16/521,240

(22) Filed: Jul. 24, 2019

(65) Prior Publication Data

US 2019/0347123 A1    Nov. 14, 2019

Related U.S. Application Data

(63) Continuation of application No. PCT/CN2017/106098, filed on Oct. 13, 2017.

(30) Foreign Application Priority Data

Jan. 24, 2017    (CN) .......................... 201710060046.6

(51) Int. Cl.
*G06F 9/455* (2018.01)
*H04L 41/083* (2022.01)

(52) U.S. Cl.
CPC ........ *G06F 9/45558* (2013.01); *H04L 41/083* (2013.01); *G06F 2009/45575* (2013.01); *G06F 2009/45595* (2013.01)

(58) Field of Classification Search
CPC ....... G06F 9/45558; G06F 2009/45575; G06F 2009/45595; H04L 41/083

USPC ............................................................ 718/1
See application file for complete search history.

(56) References Cited

U.S. PATENT DOCUMENTS

| | | | |
|---|---|---|---|
| 9,389,894 B1 | 7/2016 | Zhang et al. | |
| 2012/0005678 A1 | 1/2012 | Ge et al. | |
| 2014/0101306 A1* | 4/2014 | Murgia | H04L 47/125 |
| | | | 709/224 |
| 2014/0176583 A1 | 6/2014 | Abiezzi et al. | |

(Continued)

FOREIGN PATENT DOCUMENTS

| | | |
|---|---|---|
| CN | 103701881 A | 4/2014 |
| CN | 103988483 A | 8/2014 |

(Continued)

OTHER PUBLICATIONS

Machine Translation and Abstract of Chinese Publication No. CN103701881, Apr. 2, 2014, 17 pages.

(Continued)

*Primary Examiner* — Kenneth Tang
(74) *Attorney, Agent, or Firm* — Conley Rose, P.C.

(57) ABSTRACT

An acceleration capacity adjustment method for adjusting an acceleration capacity of a virtual machine includes determining a to-be-adjusted virtual machine and an acceleration capacity requirement of the to-be-adjusted virtual machine; and reconfiguring, based on the to-be-adjusted virtual machine and the acceleration capacity requirement, an acceleration capacity of at least one virtual accelerator device that has been allocated to the to-be-adjusted virtual machine.

20 Claims, 12 Drawing Sheets

(56) References Cited

U.S. PATENT DOCUMENTS

| | | | |
|---|---|---|---|
| 2014/0181806 A1* | 6/2014 | Abiezzi | G06F 9/5044 |
| | | | 718/1 |
| 2016/0210167 A1 | 7/2016 | Bolic et al. | |
| 2017/0286142 A1* | 10/2017 | Palermo | H04L 63/0428 |
| 2018/0210752 A1 | 7/2018 | Tang et al. | |

FOREIGN PATENT DOCUMENTS

| | | |
|---|---|---|
| CN | 105159753 A | 12/2015 |
| CN | 105579959 A | 5/2016 |
| CN | 105700930 A | 6/2016 |
| WO | 2013055812 A1 | 4/2013 |
| WO | 2014100558 A1 | 6/2014 |
| WO | 2016048430 A1 | 3/2016 |

OTHER PUBLICATIONS

Machine Translation and Abstract of Chinese Publication No. CN105700930, Jun. 22, 2016, 25 pages.

"Network Functions Virtualisation (NFV); Acceleration Technologies; Management Aspects Specification," ETSI GS NFV-IFA 004, V2.1.1, Apr. 2016, 24 pages.

Foreign Communication From A Counterpart Application, PCT Application No. PCT/CN2017/106098, English Translation of International Search Report dated Dec. 29, 2017, 2 pages.

Foreign Communication From A Counterpart Application, PCT Application No. PCT/CN2017/106098, English Translation of Written Opinion dated Dec. 29, 2017, 3 pages.

Foreign Communication From A Counterpad Application, European Application No. 17893792.6, Extended European Search Report dated Dec. 19, 2019, 8 pages.

* cited by examiner

ACCELERATION CAPACITY ADJUSTMENT METHOD AND APPARATUS FOR ADJUSTING ACCELERATION CAPACITY OF VIRTUAL MACHINE

CROSS-REFERENCE TO RELATED APPLICATIONS

This application is a continuation of International Application No. PCT/CN2017/106098, filed on Oct. 13, 2017, which claims priority to Chinese Patent Application No. 201710060046.6, filed on Jan. 24, 2017. The disclosures of the aforementioned applications are hereby incorporated by reference in their entireties.

TECHNICAL FIELD

This application relates to the field of network technologies, and in particular, to an acceleration capacity adjustment method and apparatus for adjusting an acceleration capacity of a virtual machine.

BACKGROUND

A purpose of Network Functions Virtualization (NFV) is to implement some network functions in a general-purpose high-performance server, switch, and storage using a virtualization technology.

In an evolved NFV scenario, a network device based on special-purpose hardware may be deployed on a general-purpose server using the virtualization technology, and a conventional combination form "embedded software+special-purpose hardware" is evolved into a combination form "software+general-purpose hardware". As shown in FIG. 1, to implement hardware generalization, a network function (NF) program needs to be separated from the network device based on special-purpose hardware, to form a virtualized network function (VNF) program. A combination of embedded NF software and special-purpose hardware is changed to a combination of VNF software, hypervisormiddleware, and general-purpose hardware. Therefore, the general-purpose hardware is used, and the conventional special-purpose hardware does not need to be used.

However, after the general-purpose hardware is used, high-throughput and low-latency requirements of the NF cannot be satisfied. A cause lies in that the conventional network device based on special-purpose hardware processes a network service using special-purpose accelerator hardware, after the general-purpose hardware is used, a processing capability of a central processing unit (CPU) in the general-purpose hardware is inadequate, resulting in a longer processing time. During actual application, to shorten an execution time and improve operating efficiency, some services (or functions) of an application program in the general-purpose hardware may usually be unloaded onto a hardware accelerator device for execution. Because the hardware accelerator device has a high operating speed, an execution time of the application program can be shortened.

A common acceleration service includes encryption, decryption, compression, decompression, audio and video coding, audio and video decoding, or the like. A common accelerator device includes a programmable peripheral component interconnect (PCI) device. For example, a field programmable gate array (FPGA) is accelerator hardware that is commonly used in the industry.

To improve acceleration performance, an FPGA device may be directly allocated to a virtual machine using a single-root I/O virtualization (SRIOV) technology, so that an application program that runs in the virtual machine uses the FPGA device. An SR-IOV PCI accelerator hardware management solution based on acceleration capacity awareness is a standard solution in the industry. According to the solution, expansion or reduction of an acceleration capacity of the virtual machine is implemented through allocation or releasing based on a PCI accelerator device granularity. In the solution, when a PCI accelerator device is allocated to or released from the virtual machine, allocation or releasing of the PCI accelerator device can be completed only after the virtual machine is restarted, resulting in service interruption.

SUMMARY

Embodiments of this application provide an acceleration capacity adjustment method and apparatus for adjusting an acceleration capacity of a virtual machine, to resolve a service interruption problem that occurs because, during allocation or releasing of a PCI accelerator device, the PCI accelerator device can be allocated to or released from a virtual machine only after the virtual machine is restarted.

The objective of the embodiments of this application is achieved using the following technical solutions.

According to a first aspect, an acceleration capacity adjustment method for adjusting an acceleration capacity of a virtual machine is provided, the method is used to adjust an acceleration capacity of a virtual machine, and the method includes determining a to-be-adjusted virtual machine and an acceleration capacity requirement of the to-be-adjusted virtual machine, and reconfiguring, based on the to-be-adjusted virtual machine and the acceleration capacity requirement, an acceleration capacity of at least one virtual accelerator device that has been allocated to the to-be-adjusted virtual machine.

Therefore, according to the method provided in this embodiment of this application, during adjustment of the acceleration capacity corresponding to the virtual machine, a quantity of virtual accelerator devices remains unchanged, and a newly-allocated acceleration capacity or a released acceleration capacity can take effect without restarting the virtual machine, thereby avoiding service interruption.

In a possible implementation, the reconfiguring an acceleration capacity of at least one virtual accelerator device that has been allocated to the to-be-adjusted virtual machine includes determining a to-be-adjusted virtual accelerator device, where the to-be-adjusted virtual accelerator device is the at least one virtual accelerator device that has been allocated to the to-be-adjusted virtual machine, and reconfiguring the to-be-adjusted virtual accelerator device based on the acceleration capacity requirement, so that a reconfigured acceleration capacity of the to-be-adjusted virtual machine meets the acceleration capacity requirement. If the acceleration capacity requirement is higher than the acceleration capacity of the virtual machine, an acceleration capacity is allocated, otherwise, an acceleration capacity is released.

In a specific implementation, it is assumed that the acceleration capacity requirement includes an acceleration type, an algorithm type, and an acceleration capacity value. In this case, a method in which the acceleration capacity of the at least one virtual accelerator device that has been allocated to the to-be-adjusted virtual machine is reconfigured based on the acceleration capacity requirement of the to-be-adjusted virtual machine may include but is not limited to the following method.

The following operation is performed for each of the at least one virtual accelerator device, when target configuration information exists in configuration information of a current virtual accelerator device, reconfiguring an acceleration capacity value in the target configuration information, or when no target configuration information exists in configuration information of a current virtual accelerator device, adding new target configuration information to the current virtual accelerator device, where the newly-added target configuration information includes the acceleration type, the algorithm type, and the acceleration capacity value of the acceleration capacity requirement, so that a sum of acceleration capacity values in the target configuration information that separately correspond to the at least one virtual accelerator device is equal to the acceleration capacity value of the acceleration capacity requirement, and in first target configuration information, an acceleration type is the same as the acceleration type of the acceleration capacity requirement, and an algorithm type is the same as the algorithm type of the acceleration capacity requirement.

Therefore, according to the method provided in this embodiment of this application, an accelerator device that has been allocated to the virtual machine can be reconfigured, so as to implement the acceleration capacity requirement. According to the method provided in this embodiment of this application, the acceleration capacity corresponding to the virtual machine can be changed conveniently and flexibly. A configuration method is simple, and the quantity of virtual accelerator devices does not need to be changed.

In a possible implementation, the to-be-adjusted virtual machine and the acceleration capacity requirement of the to-be-adjusted virtual machine are determined based on detected load information of the virtual machine. In a specific implementation, when load of a computing capacity of the virtual machine exceeds a preset threshold, it is determined that the virtual machine is the to-be-adjusted virtual machine, and it is determined, based on the load of the computing capacity, that the acceleration capacity requirement of the to-be-adjusted virtual machine is higher than a current acceleration capacity of the virtual machine. In a specific implementation, when the load is higher than/lower than the threshold, it is determined that the virtual machine is the to-be-adjusted virtual machine, when the load keeps higher than/lower than the threshold for a period of time, it is determined that the virtual machine is the to-be-adjusted virtual machine, the acceleration capacity requirement is an acceleration capacity decreasing/increasing the load to a threshold, or the acceleration capacity requirement is higher than/lower than a current acceleration capacity of the virtual machine. In a specific implementation, the to-be-adjusted virtual machine and the acceleration capacity requirement of the to-be-adjusted virtual machine are determined based on an allocated task of the virtual machine. When the acceleration capacity of the virtual machine cannot satisfy an acceleration requirement of the allocated task, it is determined that the virtual machine is the to-be-adjusted virtual machine, and that the acceleration capacity requirement of the to-be-adjusted virtual machine is an acceleration capacity that can satisfy the acceleration requirement of the allocated task.

Therefore, this embodiment of this application provides a plurality of methods for determining the to-be-adjusted virtual machine and the acceleration capacity requirement of the to-be-adjusted virtual machine.

According to a second aspect, an acceleration capacity adjustment method for adjusting an acceleration capacity of a virtual machine is provided, including receiving, by an accelerator agent, an acceleration capacity adjustment request, where the acceleration capacity adjustment request carries a virtual machine identifier and an acceleration capacity adjustment instruction, and determining, by the accelerator agent, a virtual machine corresponding to the virtual machine identifier, and configuring, according to the acceleration capacity adjustment instruction, a virtual accelerator device that has been allocated to the virtual machine.

Therefore, according to the method provided in this embodiment of this application, when acceleration capacity scaling is implemented based on an acceleration capacity granularity, a quantity of PCI accelerator devices remains unchanged, and a newly-allocated acceleration capacity or a released acceleration capacity can take effect without restarting the virtual machine, thereby avoiding service interruption. In addition, acceleration capacity scaling is implemented based on a virtual accelerator device granularity, and a granularity change means only allocation/releasing of an accelerator device. However, an app may appeal for changing a part of an acceleration capacity of a PCI accelerator device, and consequently a part of the acceleration capacity becomes redundant, which is equivalent to generating an ineffective resource fragment. According to the method provided in this embodiment of this application, the foregoing problem does not arise, thereby improving bandwidth resource utilization. Further, compared with acceleration capacity scaling implemented based on the virtual accelerator device granularity in which accelerator device scheduling overheads need to be increased when the app uses a plurality of accelerator devices, according to the method in which scaling is implemented based on the acceleration capacity granularity in this embodiment of this application, the app needs to use only one accelerator device without scheduling an accelerator device, thereby reducing complexity and signaling overheads.

In a possible implementation, the acceleration capacity adjustment instruction carries an acceleration capacity allocation instruction, a first acceleration type, a first algorithm type, and a first acceleration capacity value, and the acceleration capacity allocation instruction is used to instruct the accelerator agent to allocate an acceleration capacity to the virtual accelerator device that has been allocated to the virtual machine.

In this case, the virtual accelerator device that has been allocated to the virtual machine may be configured according to the acceleration capacity adjustment instruction using the following method using, by the accelerator agent as a target virtual accelerator device, any virtual accelerator device that has been allocated to the virtual machine, and if the accelerator agent configures the target virtual accelerator device according to the acceleration capacity adjustment instruction, when the accelerator agent determines that first target configuration information exists in configuration information of the target virtual accelerator device, reconfiguring, by the accelerator agent, an acceleration capacity value in the first target configuration information as a sum of an original acceleration capacity value and the first acceleration capacity value, or if the accelerator agent determines that no first target configuration information exists in configuration information of the target virtual accelerator device, adding new configuration information to the target virtual accelerator device, where the newly-added configuration information includes the first acceleration type, the first algorithm type, and the first acceleration capacity value, and in the first target configuration information, an acceleration type is the same as the first acceleration type, and an algorithm type is the same as the first algorithm type.

Therefore, the accelerator agent may directly reconfigure the target virtual accelerator device using a driver. In this way, required signaling overheads are relatively low, and no resource fragment is generated.

In a possible implementation, the acceleration capacity adjustment instruction carries an acceleration capacity releasing instruction, a second acceleration type, a second algorithm type, and a second acceleration capacity value, and the acceleration capacity releasing instruction is used to instruct the accelerator agent to release an acceleration capacity from the virtual accelerator device that has been allocated to the virtual machine. In this case, the virtual accelerator device that has been allocated to the virtual machine may be configured according to the acceleration capacity adjustment instruction using the following method using, by the accelerator agent as a target virtual accelerator device, any virtual accelerator device that has second target configuration information in the virtual accelerator device that has been allocated to the virtual machine, where in the second target configuration information, an acceleration type is the same as the second acceleration type, an algorithm type is the same as the second algorithm type, and an acceleration capacity value is greater than the second acceleration capacity value, and further, configuring, by the accelerator agent, the target virtual accelerator device according to the acceleration capacity adjustment instruction, and reconfiguring the acceleration capacity value in the second target configuration information of the target virtual accelerator device as a difference between an original acceleration capacity value and the second acceleration capacity value.

Therefore, the accelerator agent may directly reconfigure the target virtual accelerator device using a driver. In this way, required signaling overheads are relatively low, and no resource fragment is generated.

In a possible implementation, after the accelerator agent configures, according to the acceleration capacity adjustment instruction, the virtual accelerator device that has been allocated to the virtual machine, the accelerator agent feeds back a configuration result indication, where the configuration result indication is used to notify whether the acceleration capacity adjustment request is completed. Therefore, the accelerator agent can feed back a completion status of the acceleration capacity adjustment request in a timely manner, so that a user learns about a latest acceleration capacity configuration status.

In a possible implementation, the method provided in this embodiment of this application further includes performing, by the accelerator agent, statistics on acceleration capacity use information of at least one virtual accelerator device in a management range of the accelerator agent, where acceleration capacity use information of an $i^{th}$ accelerator device includes acceleration capacity usage corresponding to each combination of an acceleration type and an algorithm type of the $i^{th}$ accelerator device, and reporting the acceleration capacity use information of the at least one virtual accelerator device to an accelerator controller, so that the accelerator controller learns about acceleration capacity use information of each virtual accelerator device, and determines a device for which an acceleration capacity needs to be adjusted.

According to a second aspect, an embodiment of this application provides a physical host. The physical host includes a hardware layer including at least one physical accelerator device, a host machine running on the hardware layer, and at least one virtual machine and at least one virtual accelerator device that run on the host. The virtual accelerator device provides an acceleration capacity for the virtual machine based on the physical accelerator device, and the host is configured to implement the method in any one of the first aspect or the possible implementations of the first aspect.

According to a third aspect, an embodiment of this application provides a physical host. The physical host includes a hardware layer including at least one physical accelerator device, a host machine running on the hardware layer, and at least one virtual machine and at least one virtual accelerator device that run on the host. The virtual accelerator device provides an acceleration capacity for the virtual machine based on the physical accelerator device, and the host is configured to implement the method in any one of the second aspect or the possible implementations of the second aspect.

According to a fourth aspect, this application provides an acceleration capacity adjustment apparatus for adjusting an acceleration capacity of a virtual machine, configured to perform the method in any one of the first aspect or the possible implementations of the first aspect. In an embodiment, the apparatus includes a unit configured to perform the method in any one of the first aspect or the possible implementations of the first aspect.

According to a fifth aspect, this application provides an acceleration capacity adjustment apparatus for adjusting an acceleration capacity of a virtual machine, configured to perform the method in any one of the second aspect or the possible implementations of the second aspect. In an embodiment, the apparatus includes a unit configured to perform the method in any one of the second aspect or the possible implementations of the second aspect.

According to a sixth aspect, an acceleration capacity adjustment method for adjusting an acceleration capacity of a virtual machine is provided, including receiving, by an accelerator controller, an acceleration capacity adjustment request, where the acceleration capacity adjustment request carries a virtual machine identifier and an acceleration capacity adjustment instruction, determining, by the accelerator controller, a target accelerator agent based on the virtual machine identifier, where the target accelerator agent is an accelerator agent that is located on a same host machine as a virtual machine corresponding to the virtual machine identifier, and sending, by the accelerator controller, the acceleration capacity adjustment request to the target accelerator agent. Therefore, according to the method provided in this embodiment of this application, during adjustment of the acceleration capacity corresponding to the virtual machine, a quantity of virtual accelerator devices remains unchanged, and a newly-allocated acceleration capacity or a released acceleration capacity can take effect without restarting the virtual machine, thereby avoiding service interruption.

In a possible implementation, the acceleration capacity adjustment instruction carries an acceleration capacity releasing instruction and a first acceleration capacity parameter, and the sending, by the accelerator controller, the acceleration capacity adjustment request to the target accelerator agent includes determining, by the accelerator controller, a first acceleration capacity value based on the first acceleration capacity parameter, and when determining that occupancy of an acceleration capacity of accelerator device hardware in the host machine is greater than or equal to the first acceleration capacity value, sending, by the accelerator controller, the acceleration capacity adjustment request to the target accelerator agent. Therefore, using the foregoing determining process, an inappropriate acceleration capacity adjustment request can be effectively prevented from being sent to the target accelerator agent.

In a possible implementation, the acceleration capacity adjustment instruction carries an acceleration capacity allocation instruction and a second acceleration capacity parameter, and the sending, by the accelerator controller, the acceleration capacity adjustment request to the target accelerator agent includes determining, by the accelerator controller, a second acceleration capacity value based on the second acceleration capacity parameter, and when determining that a remaining amount of an acceleration capacity of accelerator device hardware in the host machine is greater than or equal to the second acceleration capacity value, sending, by the accelerator controller, the acceleration capacity adjustment request to the target accelerator agent. Therefore, using the foregoing determining process, an inappropriate acceleration capacity adjustment request can be effectively prevented from being sent to the target accelerator agent.

In a possible implementation, the method further includes receiving, by the accelerator controller, acceleration capacity use information of at least one virtual accelerator device reported by the target accelerator agent, where acceleration capacity use information of an $i^{th}$ virtual accelerator device includes acceleration capacity usage corresponding to each combination of an acceleration type and an algorithm type of the $i^{th}$ virtual accelerator device, and the method further includes, when determining that the remaining amount of the acceleration capacity of the virtual accelerator device hardware is less than the second acceleration capacity value, determining, by the accelerator controller based on the acceleration capacity use information of the at least one virtual accelerator device and configuration information of the at least one virtual accelerator device stored by the accelerator controller, a virtual accelerator device from which an acceleration capacity needs to be released and a corresponding acceleration capacity adjustment instruction, sending, by the accelerator controller to the target accelerator agent, the acceleration capacity adjustment instruction corresponding to the virtual accelerator device from which the acceleration capacity needs to be released, so that after the target accelerator agent configures the virtual accelerator device from which the acceleration capacity needs to be released, the remaining amount of the acceleration capacity of the accelerator device hardware is greater than or equal to the second acceleration capacity value, and sending, by the accelerator controller, the acceleration capacity adjustment request to the target accelerator agent. Therefore, the accelerator controller can determine, based on the acceleration capacity use information of the at least one virtual accelerator device and the configuration information of the at least one virtual accelerator device stored by the accelerator controller, the virtual accelerator device from which the acceleration capacity needs to be released and the corresponding acceleration capacity adjustment instruction. According to the foregoing method, the accelerator device hardware in the host machine can be effectively used, and different acceleration capacity requirements on virtual accelerator devices can be better satisfied for all virtual machines in the host machine.

In a possible implementation, after the sending, by the accelerator controller, the acceleration capacity adjustment request to the target accelerator agent, the method further includes receiving, by the accelerator controller, a configuration result indication fed back by the target accelerator agent, where the configuration result indication is used to notify the accelerator controller whether the acceleration capacity adjustment request is completed. After receiving the configuration result indication fed back by the accelerator agent, the accelerator controller may further feed back the configuration result indication to a management. Therefore, the accelerator agent can feed back a completion status of the acceleration capacity adjustment request to the accelerator controller in a timely manner, so that a user learns about a latest acceleration capacity configuration status.

Beneficial effects of the embodiments of this application are as follows. According to the method provided in the embodiments of this application, the to-be-adjusted virtual machine and the acceleration capacity requirement of the to-be-adjusted virtual machine are determined, and then the acceleration capacity of the at least one virtual accelerator device that has been allocated to the to-be-adjusted virtual machine is reconfigured based on the to-be-adjusted virtual machine and the acceleration capacity requirement. Therefore, according to the method provided in the embodiments of this application, acceleration capacity scaling is implemented based on the acceleration capacity granularity, the quantity of virtual accelerator devices remains unchanged, and the newly-allocated acceleration capacity or the released acceleration capacity can take effect without restarting the virtual machine, thereby avoiding service interruption. In addition, acceleration capacity scaling is implemented based on the virtual accelerator device granularity, and the granularity change means only allocation/releasing of the accelerator device. However, the app may appeal for changing a part of an acceleration capacity of a virtual accelerator device, and consequently a part of the acceleration capacity becomes redundant, which is equivalent to generating the ineffective resource fragment. According to the method provided in the embodiments of this application, the foregoing problem does not arise, and the bandwidth resource utilization can be effectively improved. Further, compared with acceleration capacity scaling implemented based on the virtual accelerator device granularity in in which accelerator device scheduling overheads need to be increased when the app uses the plurality of accelerator devices, according to the method in which scaling is implemented based on the acceleration capacity granularity in the embodiments of this application, the app needs to use only one accelerator device without scheduling an accelerator device, thereby reducing implementation complexity and the signaling overheads.

DESCRIPTION OF EMBODIMENTS

The following describes the embodiments of this application with reference to accompanying drawings.

Figure 1:
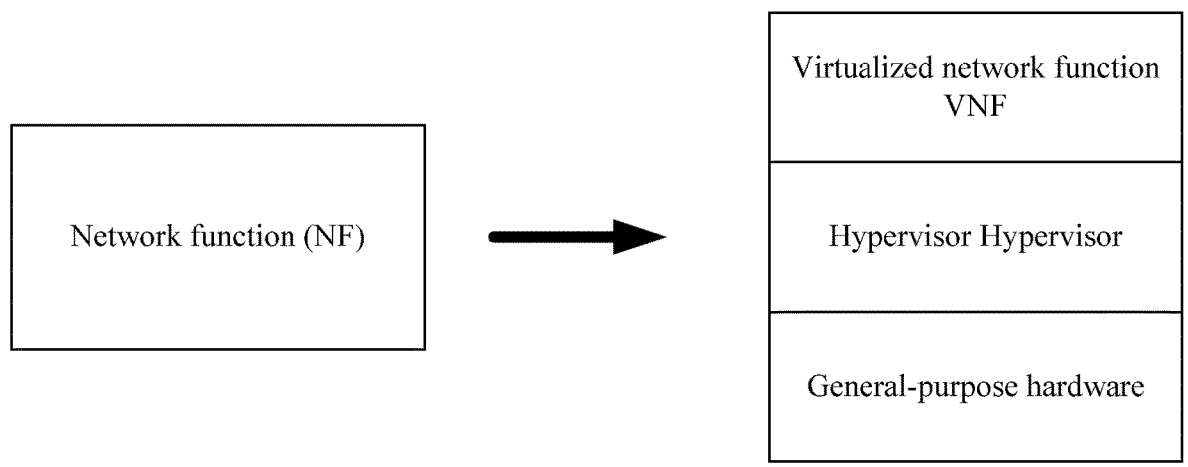
FIG. 1 is a schematic structural diagram of hardware generalization in the Background of this application.
Figure 2:
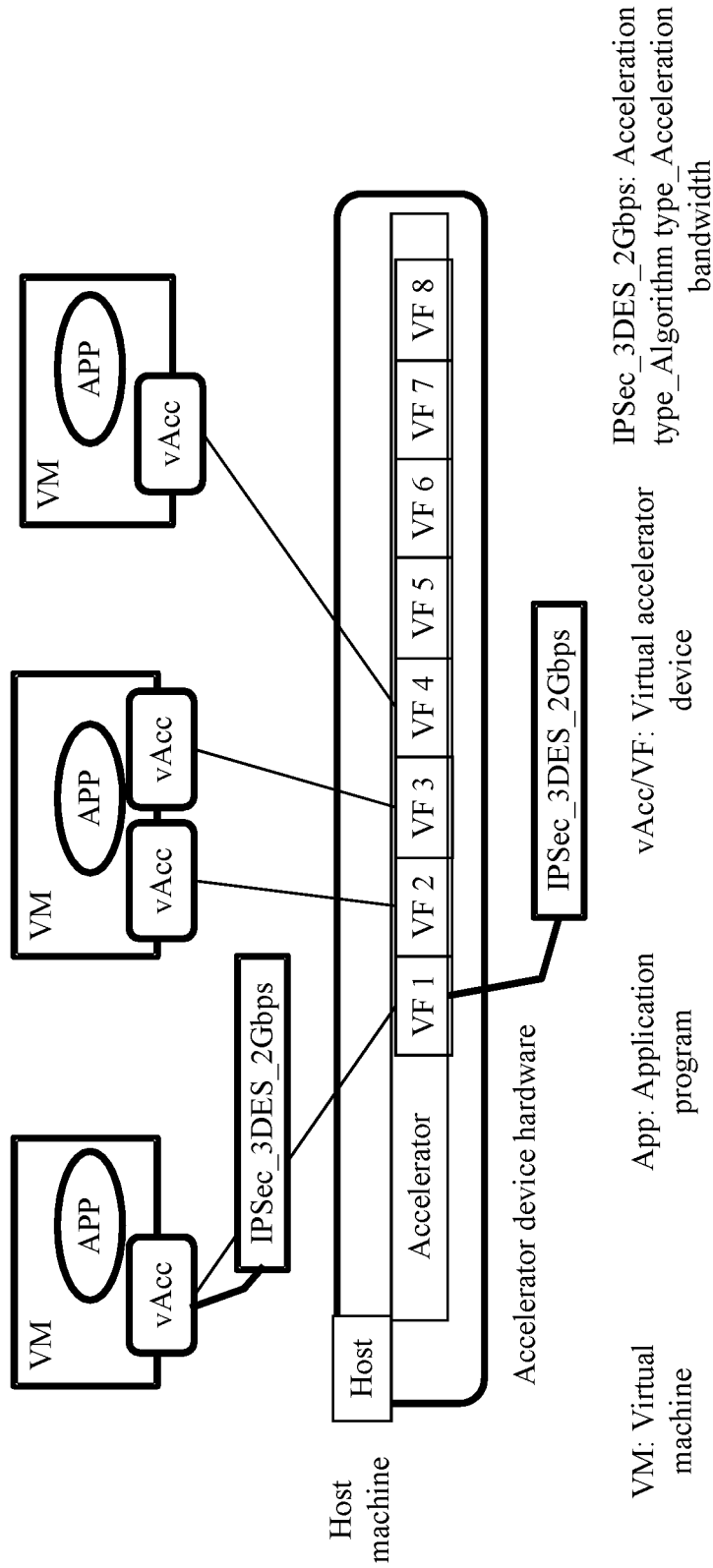
FIG. 2 shows a basic network structure corresponding to an SR-IOV PCI accelerator hardware management solution based on acceleration capacity awareness according to an embodiment of this application.

FIG. 2 shows a basic network structure corresponding to an SR-IOV PCI acceleration hardware management solution based on acceleration capacity awareness. The network structure includes the following units, a virtual machine (VM), an application program (APP) that runs on each VM, a virtual accelerator device (vAcc) allocated to the VM, a host machine (Host), and accelerator device hardware (Accelerator), where the app corresponds to a VNF in an NFV scenario, a virtual accelerator device (Virtual Function, VF) 1 to a VF 8 are virtualized from the accelerator using an SR-IOV technology, and there is a correspondence between a VF and a vAcc.

In FIG. 2, IPSec_3DES_2 Gbps marked under a vAcc is used to describe an acceleration capacity of the vAcc, where IPSec represents an acceleration type, 3DES represents an algorithm type, and 2 gigabytes per second (Gbps) represents an acceleration capacity value.

In addition, as shown in FIG. 2, the network structure further includes, a management module, which may be an OPENSTACK NOVA component, and an accelerator controller that is deployed on an OPENSTACK control server (Server-Controller), that is configured to manage accelerator devices on all hosts, and that is responsible for determining, based on an acceleration capacity adjustment request sent by the management, an accelerator agent corresponding to the request, and a VF allocated to a VM and configuration information of the VF, or a VF that needs to be released from a VM, and sending a corresponding instruction to the accelerator agent.

The accelerator agent is deployed on the host, and responsible for allocating an indicated VF to the VM on the host according to the instruction of the accelerator controller and configuring corresponding configuration information for the indicated VF, or releasing the indicated VF.

Figure 3:
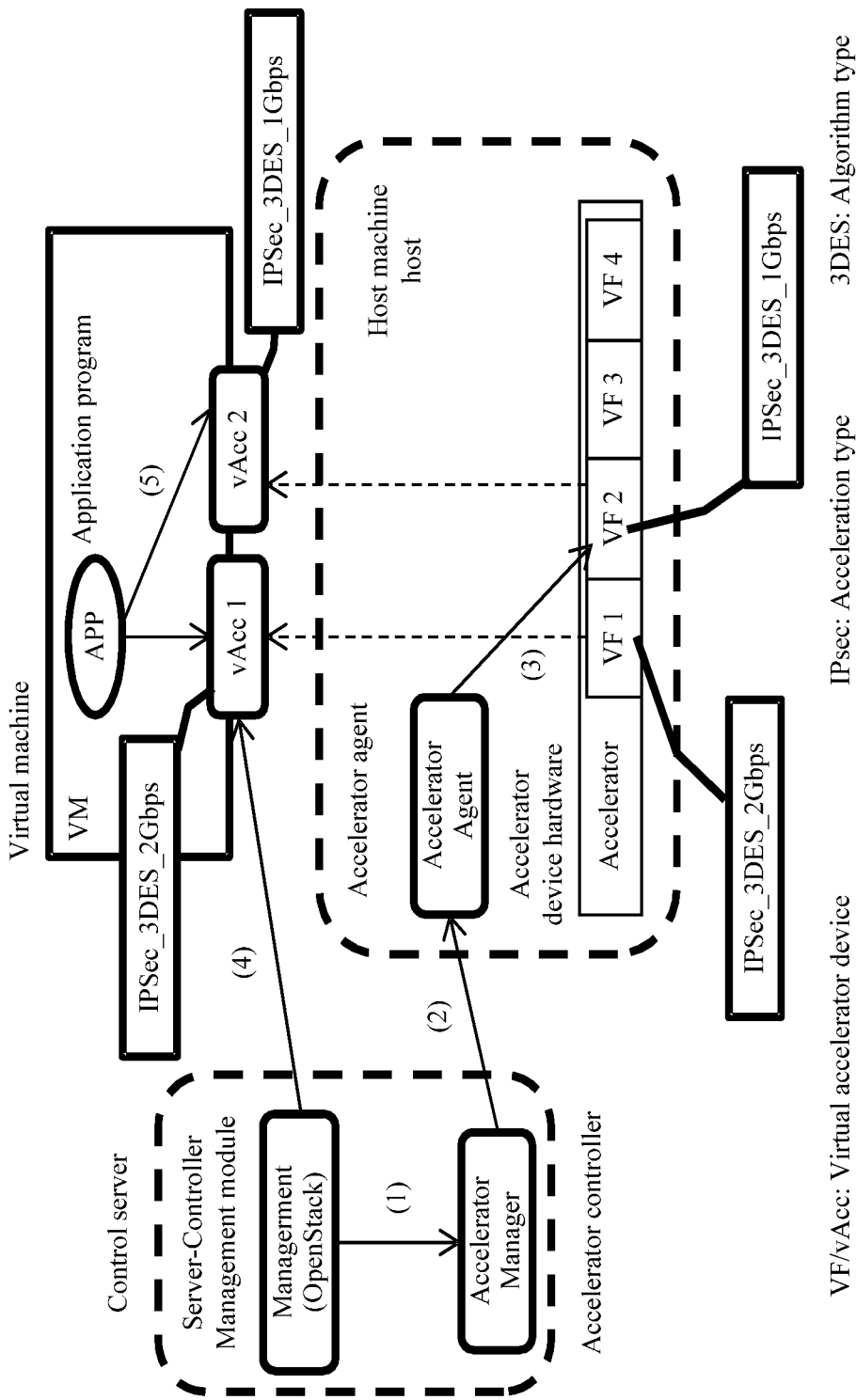
FIG. 3 is a specific flowchart of allocating an acceleration capacity to a VM 1 according to an embodiment of this application.
Figure 4:
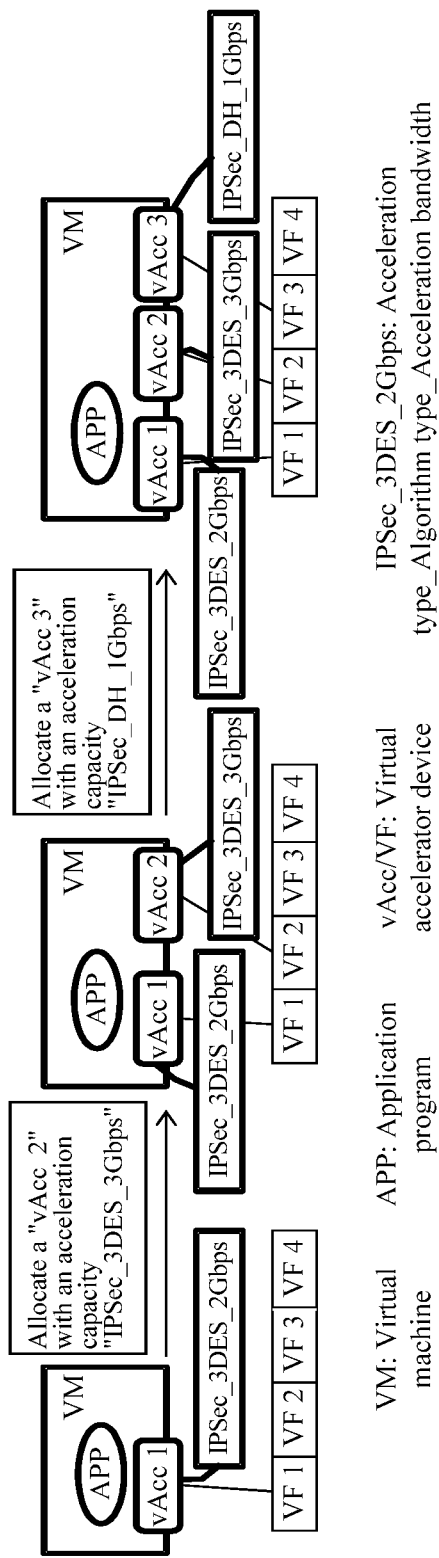
FIG. 4 is a schematic diagram of a PCI accelerator device allocation performed a plurality of times according to an embodiment of this application.
Figure 5:
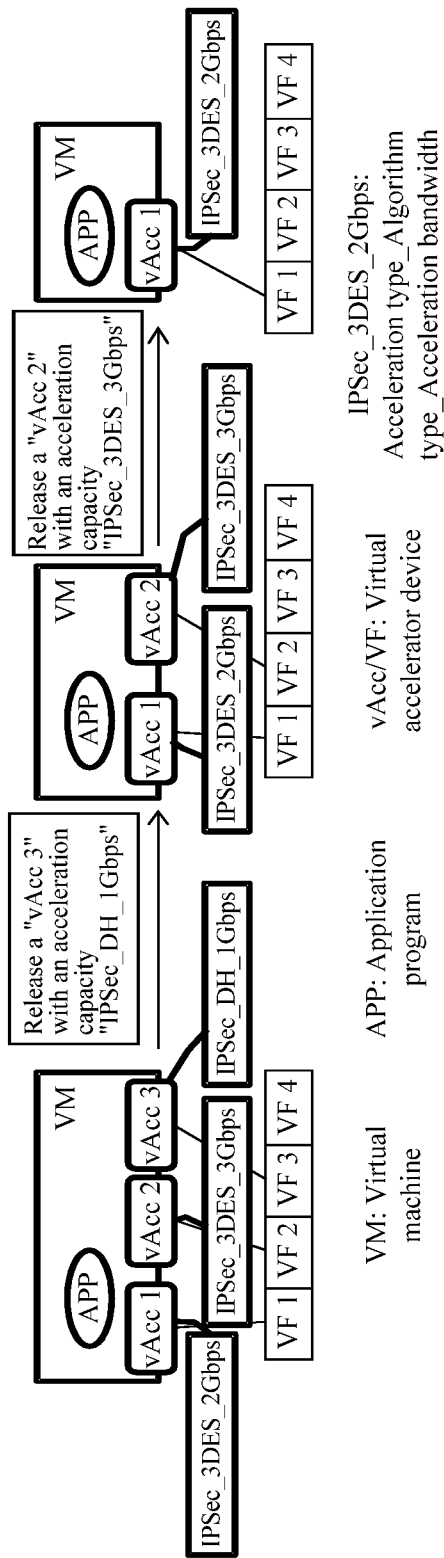
FIG. 5 is a schematic diagram of a PCI accelerator device releasing performed a plurality of times according to an embodiment of this application.

In an embodiment, as shown in FIG. 3, FIG. 4, and FIG. 5, a specific procedure for allocating an acceleration capacity to a VM 1 and a specific procedure for releasing an acceleration capacity from the VM 1 are described.

As shown in FIG. 3, it is assumed that an accelerator device that has been allocated to the VM 1 is a vAcc 1. The vAcc 1 corresponds to a VF 1 of an accelerator, and configuration information of the accelerator device is IPSec_3DES_2 Gbps.

(1) A management sends an accelerator device allocation request to an accelerator controller, to request the accelerator controller to allocate a PCI accelerator device (namely, a VF) to the VM 1, and specifies an acceleration capacity of the accelerator device as "IPSec_3DES_1Gbps".

(2) After receiving an accelerator device application request, the accelerator controller selects an unoccupied VF 2 from a host on which the VM 1 is located, and sends the accelerator device allocation request to an accelerator agent of the host on which the VM 1 is located.

(3) The accelerator agent performs accelerator device allocation according to the received accelerator device allocation request, configures an acceleration capacity of the VF 2 as "IPSec_3DES_1Gbps", and returns a PCI address of the VF 2 to the accelerator controller.

The accelerator controller returns the PCI address of the allocated VF 2 to the management.

The returning steps are not shown in FIG. 3.

(4) The management configures the PCI address of the VF 2 in a configuration file of the VM 1.

(5) An app in the VM 1 can use a vAcc 2 corresponding to the VF 2 only after the VM 1 is restarted.

As shown in FIG. 4, PCI accelerator device allocation may be performed a plurality of times using the method shown in FIG. 3. In FIG. 4, an accelerator device that has been allocated to a VM is a vAcc 1, and configuration information of the vAcc 1 is IPSec_3DES_2 Gbps. An accelerator device that is allocated to the VM using the foregoing steps is a vAcc 2, and configuration information of the vAcc 2 is IPSec_3DES_3 Gbps. Then, an accelerator device that can be further allocated to the VM is a vAcc 3, and configuration information of the vAcc 3 is IPSec__DHiGbps. However, a new accelerator device allocated each time can be used only after the VM is restarted.

Contrary to the process shown in FIG. 3, it is assumed that accelerator devices that have been allocated to a VM 1 are a vAcc 1 and a vAcc 2, configuration information of the vAcc 1 is IPSec_3DES_2 Gbps, and configuration information of the vAcc 2 is IPSec_3DES_1 Gbps.

A management sends an accelerator device releasing request to an accelerator controller, to instruct to release the PCI accelerator device vAcc 2 from the VM 1.

After receiving the accelerator device releasing request, the accelerator controller sends the accelerator device releasing request to an accelerator agent of a host on which the VM 1 is located.

The accelerator agent performs accelerator device releasing according to the received accelerator device releasing request, configures an acceleration capacity of a VF 2 corresponding to the vAcc 2 as null, and returns information indicating that the VF 2 corresponding to the vAcc 2 is released successfully.

The accelerator controller returns, to the management, the information indicating that the VF 2 corresponding to the vAcc 2 is released successfully.

The management removes, from a configuration file of the VM 1, a PCI address of the VF 2 corresponding to the vAcc 2, and releasing the vAcc 2 from the VM 1 completes after the VM 1 is restarted.

Similarly, as shown in FIG. 5, PCI accelerator device releasing may be performed a plurality of times using the foregoing method. In FIG. 5, accelerator devices that have been allocated to a VM are a vAcc 1, a vAcc 2, and a vAcc 3, configuration information of the vAcc 1 is IPSec_3DES_2

Gbps, configuration information of the vAcc 2 is IPSec_3DES_3 Gbps, and configuration information of the vAcc 3 is IPSec_DHiGbps. Through the foregoing steps, the vAcc 3 may be first released, and then the vAcc 2 may be released.

Figure 6:
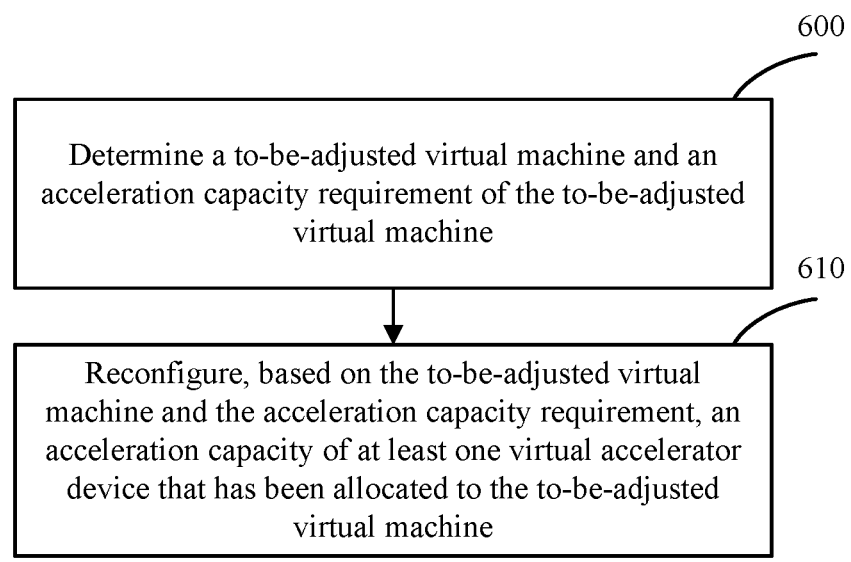
FIG. 6 is an overview flowchart of an acceleration capacity adjustment method according to an embodiment of this application.

It can be learned from the foregoing that when acceleration capacity scaling is performed on the virtual machine, a service is interrupted because the virtual machine needs to be restarted. Therefore, an embodiment of this application provides an acceleration capacity adjustment method. As shown in FIG. 6, the method includes the following steps.

Step 600: Determine a to-be-adjusted virtual machine and an acceleration capacity requirement of the to-be-adjusted virtual machine.

In an embodiment, a host may perform statistics on acceleration capacity use statuses of VMs in real time and further determine the to-be-adjusted virtual machine, or receive an acceleration capacity adjustment request sent by an accelerator controller and determine the to-be-adjusted virtual machine.

In a specific implementation, when load of a computing capacity of a virtual machine exceeds a preset threshold, it is determined that the virtual machine is the to-be-adjusted virtual machine, and it is determined, based on the load of the computing capacity, that the acceleration capacity requirement of the to-be-adjusted virtual machine is higher than a current acceleration capacity of the virtual machine.

In a specific implementation, when the load is higher than/lower than the threshold, it is determined that the virtual machine is the to-be-adjusted virtual machine, when the load keeps higher than/lower than the threshold for a period of time, it is determined that the virtual machine is the to-be-adjusted virtual machine. The acceleration capacity requirement is an acceleration capacity decreasing/increasing the load to a threshold, or the acceleration capacity requirement is higher than/lower than the current acceleration capacity of the virtual machine.

In a specific implementation, the to-be-adjusted virtual machine and the acceleration capacity requirement of the to-be-adjusted virtual machine are determined based on an allocated task of the virtual machine. When the acceleration capacity of the virtual machine cannot satisfy an acceleration requirement of the allocated task, it is determined that the virtual machine is the to-be-adjusted virtual machine, and that the acceleration capacity requirement of the to-be-adjusted virtual machine is an acceleration capacity that can satisfy the acceleration requirement of the allocated task.

For example, an accelerator device that has been allocated to a VM 1 is a vAcc 1, and configuration information of the vAcc 1 is IPSec_3DES_2 Gbps. The host determines, based on an acceleration capacity use status of the VM 1, that an acceleration capacity corresponding to the VM 1 needs to be adjusted. An acceleration capacity requirement of the VM 1 is IPSec_3DES_5 Gbps.

Step 610: Reconfigure, based on the to-be-adjusted virtual machine and the acceleration capacity requirement, an acceleration capacity of at least one virtual accelerator device that has been allocated to the to-be-adjusted virtual machine.

In an embodiment, the at least one virtual accelerator device may be determined from all virtual accelerator devices or any device that has been allocated to the to-be-adjusted virtual machine or according to another preset filtering rule.

In a possible implementation, for example, it is assumed that the acceleration capacity requirement includes a first acceleration type, a first algorithm type, and a first acceleration capacity value. In this case, a method in which the acceleration capacity of the at least one virtual accelerator device is reconfigured based on the acceleration capacity requirement of the to-be-adjusted virtual machine may include but is not limited to the following method.

The following operation is performed for each of the at least one virtual accelerator device, when configuration information of a current virtual accelerator device includes first target configuration information, reconfiguring an acceleration capacity value in the first target configuration information, or when configuration information of a current virtual accelerator device includes no first target configuration information, adding new first target configuration information to the current virtual accelerator device, where the newly-added first target configuration information includes the first acceleration type, the first algorithm type, and the acceleration capacity value, so that a sum of acceleration capacity values in the first target configuration information that separately correspond to the at least one virtual accelerator device is equal to the first acceleration capacity value.

In the first target configuration information, an acceleration type is the same as the first acceleration type, and an algorithm type is the same as the first algorithm type.

For example, the acceleration capacity requirement of the VM 1 is IPSec_3DES_5 Gbps, and accelerator devices that have been allocated to the VM 1 are the vAcc 1 and a vAcc 2. The configuration information of the vAcc 1 is IPSec_3DES_2 Gbps, and configuration information of the vAcc 2 is IPSec_3DES_1 Gbps. Therefore, the configuration information of the vAcc 1 may be reconfigured as IPSec_3DES_3 Gbps, and the configuration information of the vAcc 2 may be reconfigured as IPSec_3DES_2 Gbps, so that a sum of acceleration capacity values of the vAcc 1 and the vAcc 2 is 5 Gbps after reconfiguration, satisfying the acceleration capacity requirement of the VM 1.

Figure 7:
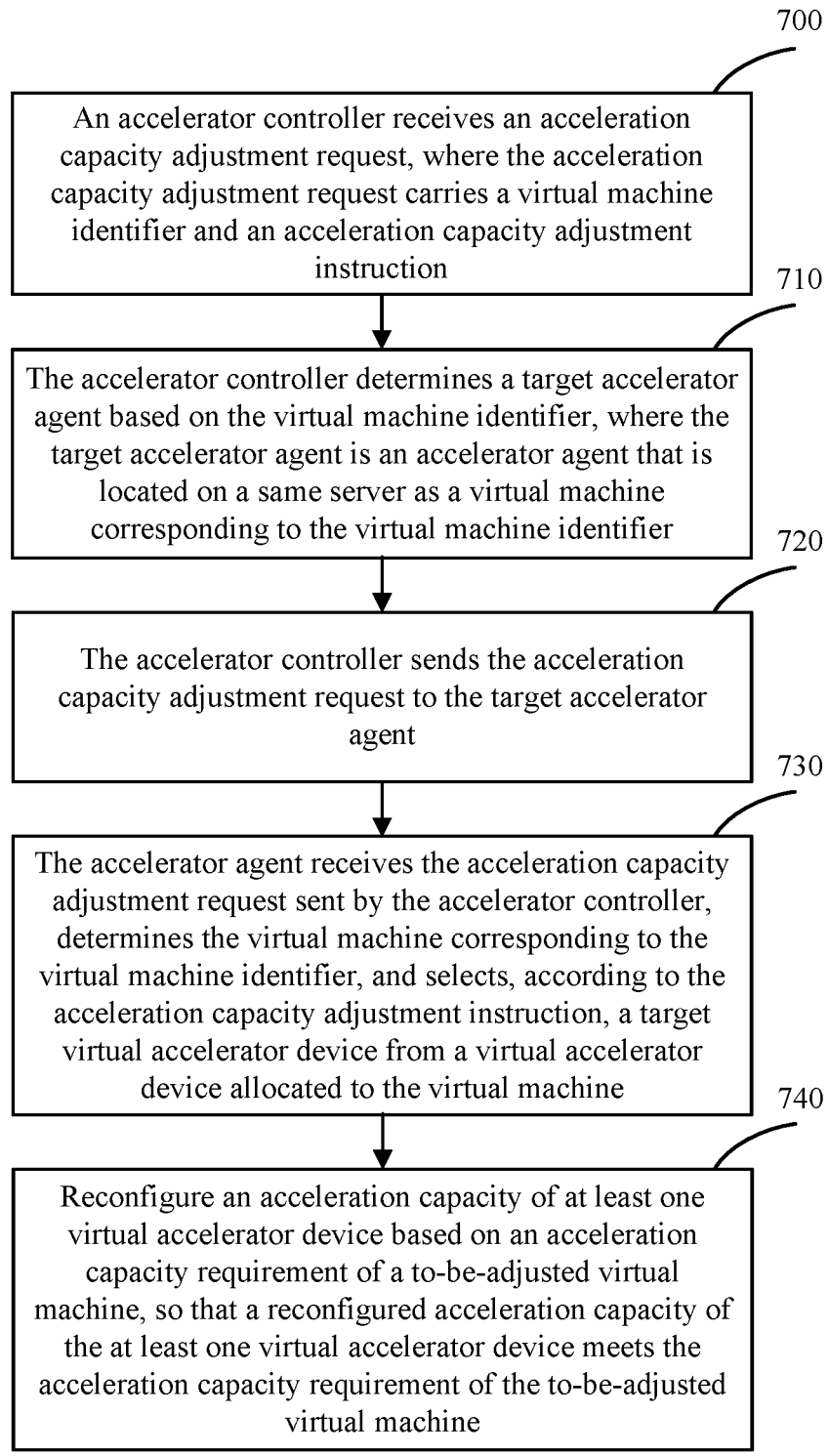
FIG. 7 is a specific flowchart of an acceleration capacity adjustment method according to an embodiment of this application.

As shown in FIG. 7, an embodiment of the present disclosure provides an acceleration capacity adjustment method. The method includes the following steps.

Step 700: An accelerator controller receives an acceleration capacity adjustment request.

The acceleration capacity adjustment request carries a virtual machine identifier and an acceleration capacity adjustment instruction.

In an embodiment, the acceleration capacity adjustment request is sent by a management to the accelerator controller.

Step 710: The accelerator controller determines a target accelerator agent based on the virtual machine identifier.

The target accelerator agent is an accelerator agent that is located on a same host machine as a virtual machine corresponding to the virtual machine identifier.

In an embodiment, the accelerator controller determines the corresponding virtual machine based on the virtual machine identifier, further determines the host machine on which the virtual machine is located, and then uses an accelerator agent in the host machine as the target accelerator agent.

Step 720: The accelerator controller sends the acceleration capacity adjustment request to the target accelerator agent.

When step 720 is being performed, the following several implementation processes may be included.

First Implementation Process.

The acceleration capacity adjustment instruction carries an acceleration capacity releasing instruction, a first acceleration type, a first algorithm type, and a first acceleration capacity value.

In this case, the accelerator controller determines, based on the first acceleration capacity value, whether occupancy of an acceleration capacity of accelerator device hardware in the host machine is greater than or equal to the first acceleration capacity value, and if the occupancy is greater than or equal to the first acceleration capacity value, sends the acceleration capacity adjustment request to the target accelerator agent, or if the occupancy is less than the first acceleration capacity value, skips sending the acceleration capacity adjustment request to the target accelerator agent.

Using the foregoing determining process, an inappropriate acceleration capacity adjustment request can be effectively prevented from being sent to the target accelerator agent.

Second Implementation Process.

The acceleration capacity adjustment instruction carries an acceleration capacity allocation instruction, a second acceleration type, a second algorithm type, and a second acceleration capacity value.

In this case, the accelerator controller determines, based on the second acceleration capacity value, whether a remaining amount of an acceleration capacity of accelerator device hardware in the host machine is greater than or equal to the second acceleration capacity value, and if the remaining amount is greater than or equal to the second acceleration capacity value, sends the acceleration capacity adjustment request to the target accelerator agent, or if the remaining amount is less than the second acceleration capacity value, skips sending the acceleration capacity adjustment request to the target accelerator agent.

Using the foregoing determining process, an inappropriate acceleration capacity adjustment request can be effectively prevented from being sent to the target accelerator agent.

In addition, in this embodiment of this application, the accelerator controller receives acceleration capacity use information of at least one virtual accelerator device reported by the target accelerator agent. Acceleration capacity use information of an $i^{th}$ virtual accelerator device includes acceleration capacity usage corresponding to each combination of an acceleration type and an algorithm type of the $i^{th}$ virtual accelerator device. Therefore, the accelerator controller can learn about acceleration capacity usage of each virtual accelerator device. In this case, the accelerator controller can determine, based on known configuration information of a virtual accelerator device, a virtual accelerator device from which an acceleration capacity needs to be released and a corresponding acceleration capacity adjustment instruction.

For example, a virtual accelerator device that has been allocated by the host to a VM 1 is a vAcc 1, and configuration information of the vAcc 1 is IPSec_3DES_3 Gbps and IPSec_DH_2Gbp. It can be learned, from acceleration capacity use information of the vAcc 1 reported by the accelerator agent to the accelerator controller, that acceleration capacity usage corresponding to a combination of an acceleration type IPSec3 and an algorithm type DES is 1 Gbps and acceleration capacity usage corresponding to a combination of an acceleration type IPSec3 and an algorithm type DH is 2 Gbps. Therefore, the accelerator controller determines that the vAcc 1 is a virtual accelerator device from which an acceleration capacity needs to be released. The acceleration capacity adjustment request carries an identifier of the VM 1 and an acceleration capacity adjustment instruction. The acceleration capacity adjustment instruction may be an acceleration capacity releasing instruction and IPSec_3DES_2 Gbps. Alternatively, the acceleration capacity adjustment instruction may be an acceleration capacity releasing instruction and IPSec_3DES_1 Gbps. The accelerator controller sends the acceleration capacity adjustment request to the accelerator agent in the host, so that the accelerator agent configures the vAcc 1 according to the acceleration capacity adjustment request and releases a part of an acceleration capacity from the vAcc 1. Therefore, the accelerator controller can determine, based on the acceleration capacity use information of the at least one virtual accelerator device and configuration information of the at least one virtual accelerator device stored by the accelerator controller, the virtual accelerator device from which the acceleration capacity needs to be released and the corresponding acceleration capacity adjustment instruction.

In an embodiment, when the accelerator controller determines that the remaining amount of the acceleration capacity of the virtual accelerator device hardware is less than the second acceleration capacity value, the accelerator controller may perform the foregoing operation process, so that after the target accelerator agent configures the virtual accelerator device from which the acceleration capacity needs to be released, the remaining amount of the acceleration capacity of the accelerator device hardware is greater than or equal to the second acceleration capacity value.

The accelerator controller may continue to send an acceleration capacity adjustment request to the target accelerator agent, to allocate the released acceleration capacity to another virtual accelerator device.

Therefore, according to the foregoing method, the accelerator device hardware in the host machine can be effectively used, and different acceleration capacity requirements on virtual accelerator devices can be better satisfied for all virtual machines in the host machine.

Step 730: The accelerator agent receives the acceleration capacity adjustment request sent by the accelerator controller.

Step 740: The accelerator agent determines a virtual machine corresponding to the virtual machine identifier, and configures, according to an acceleration capacity adjustment instruction, a virtual accelerator device that has been allocated to the virtual machine.

Optionally, after the accelerator agent performs step 740, the accelerator agent feeds back a configuration result indication to the accelerator controller. The configuration result indication is used to notify the accelerator controller whether the acceleration capacity adjustment request is completed, for example, configuration succeeds or configuration fails. Optionally, after receiving the configuration result indication fed back by the accelerator agent, the accelerator controller may further feed back the configuration result indication to the management.

In an embodiment, in step 730, the accelerator agent determines the virtual machine corresponding to the virtual machine identifier, and the virtual accelerator device allocated to the virtual machine. Further, the acceleration capacity adjustment request received by the accelerator agent includes two types, and the following two cases are specifically included.

In a first case, the acceleration capacity adjustment instruction is an acceleration capacity allocation instruction. The acceleration capacity allocation instruction is used to instruct the accelerator agent to allocate an acceleration capacity to the virtual accelerator device that has been allocated to the virtual machine.

In an embodiment, the acceleration capacity adjustment instruction further carries a first acceleration type, a first algorithm type, and a first acceleration capacity value.

In this case, when the accelerator agent performs step 740, the accelerator agent uses, as a target virtual accelerator device, any virtual accelerator device allocated to the virtual machine. Further, two specific cases are included.

First, when determining that first target configuration information exists in configuration information of the target virtual accelerator device, the accelerator agent reconfigures an acceleration capacity value in the first target configuration information as a sum of an original acceleration capacity value and the first acceleration capacity value.

Second, when determining that no first target configuration information exists in configuration information of the target virtual accelerator device, the accelerator agent adds new configuration information to the target virtual accelerator device, where the newly-added configuration information includes the first acceleration type, the first algorithm type, and the first acceleration capacity value.

In the first target configuration information, an acceleration type is the same as the first acceleration type, and an algorithm type is the same as the first algorithm type.

For example, virtual accelerator devices that have been allocated by the host to a VM 1 are a vAcc 1 and a vAcc 2, configuration information of the vAcc 1 is IPSec_3DES_3 Gbps, and configuration information of the vAcc 2 is IPSec_DH_2 Gbps. It is assumed that the acceleration capacity adjustment instruction carries the acceleration capacity allocation instruction and IPSec_3DES_2 Gbps.

If the accelerator agent uses the vAcc 1 as the target virtual accelerator device, the configuration information of the vAcc 1 is the first target configuration information, because in the configuration information of the vAcc 1, an acceleration type is the same as the first acceleration type, and an algorithm type is the same as the first algorithm type. In this case, the configuration information of the vAcc 1 is reconfigured as IPSec_3DES_5 Gbps.

If the accelerator agent uses the vAcc 2 as the target virtual accelerator device, the configuration information of the vAcc 2 does not include the first target configuration information. In this case, new configuration information IPSec_3DES_2 Gbps is added to the vAcc 2, and finally, the configuration information of the vAcc 2 is IPSec_DH_2Gbp and IPSec_3DES_2 Gbps.

In a second case, the acceleration capacity adjustment instruction is an acceleration capacity releasing instruction. The acceleration capacity releasing instruction is used to instruct the accelerator agent to release an acceleration capacity from the virtual accelerator device that has been allocated to the virtual machine.

In an embodiment, the acceleration capacity adjustment instruction further carries the acceleration capacity releasing instruction, a second acceleration type, a second algorithm type, and a second acceleration capacity value.

In this case, when the accelerator agent performs step 740, the accelerator agent uses, as a target virtual accelerator device, any virtual accelerator device that has second target configuration information in the virtual accelerator device that has been allocated to the virtual machine. In the second target configuration information, an acceleration type is the same as the second acceleration type, an algorithm type is the same as the second algorithm type, and an acceleration capacity value is greater than the second acceleration capacity value.

The accelerator agent reconfigures the acceleration capacity value in the second target configuration information of the target virtual accelerator device as a difference between an original acceleration capacity value and the second acceleration capacity value.

For example, virtual accelerator devices that have been allocated by the host to a VM 1 are a vAcc 1 and a vAcc 2, configuration information of the vAcc 1 is IPSec_3DES_3 Gbps, and configuration information of the vAcc 2 is IPSec_DH_2 Gbps. It is assumed that the acceleration capacity adjustment instruction carries the acceleration capacity releasing instruction and IPSec_3DES_1 Gbps.

In this case, the accelerator agent determines that the second target configuration information exists in the configuration information of the vAcc 1, because in the configuration information of the vAcc 1, an acceleration type is the same as the first acceleration type, an algorithm type is the same as the first algorithm type, and 3 Gbps is greater than 1 Gbps, and the accelerator agent uses the vAcc 1 as the target virtual accelerator device. In this case, the configuration information of the vAcc 1 is reconfigured as IPSec_3DES_2 Gbps.

In an embodiment, it is assumed that the acceleration capacity adjustment instruction carries the acceleration capacity releasing instruction and IPSec_3DES_4 Gbps. In this case, there is no target virtual accelerator device satisfying a condition. Therefore, the accelerator agent returns a configuration result indication to the accelerator controller to indicate that configuration fails, and the acceleration capacity adjustment request cannot be completed.

In addition, the accelerator agent may invoke an accelerator device driver and perform statistics on acceleration capacity use information of at least one virtual accelerator device in a management range of the accelerator agent. Acceleration capacity use information of an $i^{th}$ accelerator device includes acceleration capacity usage corresponding to each combination of an acceleration type and an algorithm type of the $i^{th}$ accelerator device.

The accelerator agent reports the acceleration capacity use information of the at least one virtual accelerator device to the accelerator controller, so that the accelerator controller determines an accelerator device from which an acceleration capacity needs to be released.

The following describes in detail the method provided in this embodiment of this application with reference to the accompanying drawing.

Figure 8:
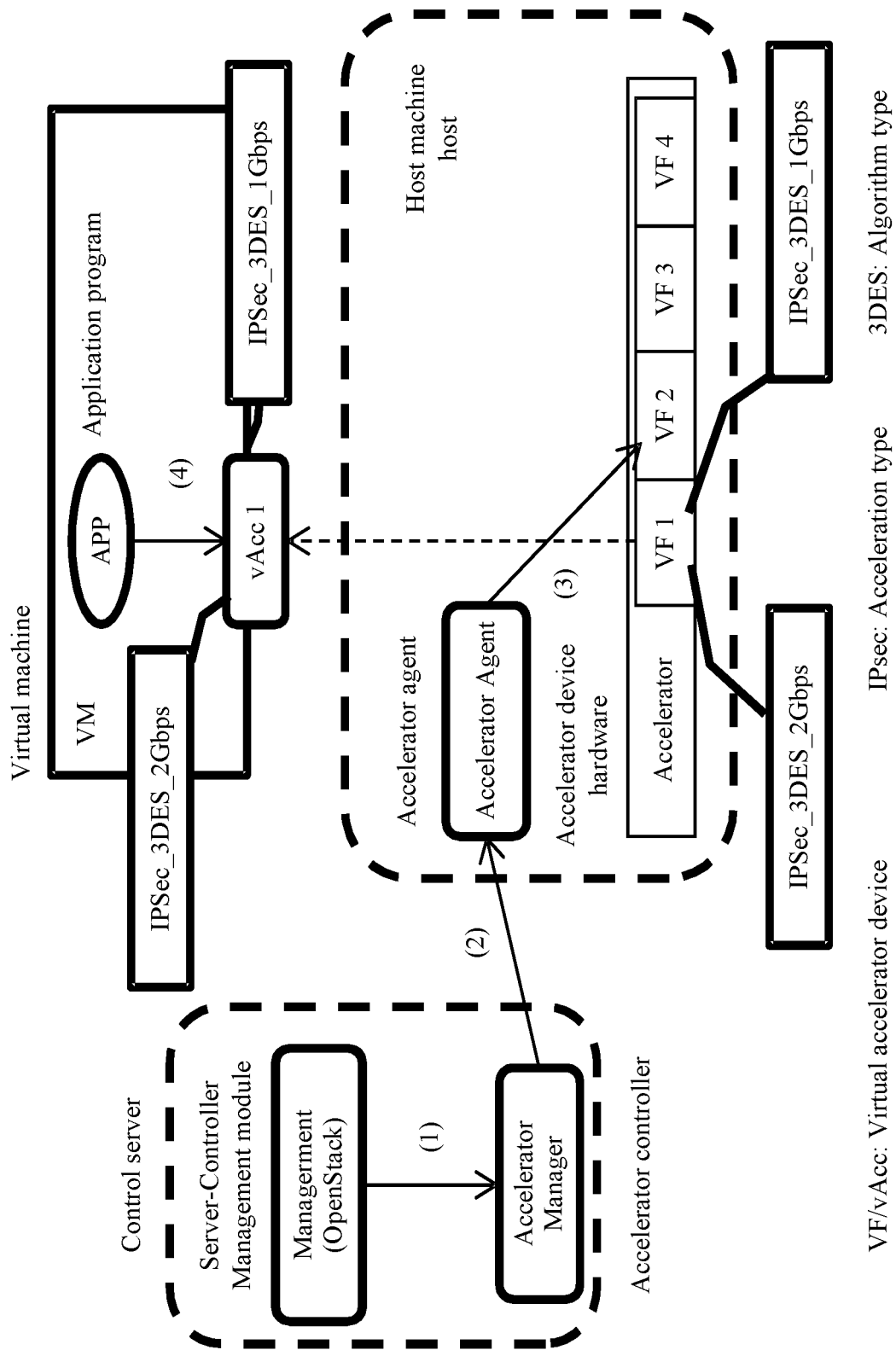
FIG. 8 is a schematic diagram of interaction between devices in an acceleration capacity adjustment process according to an embodiment of this application.

As shown in FIG. 8, (1) a management sends an acceleration capacity adjustment request to an accelerator controller, where the acceleration capacity adjustment request carries an identifier of a VM 1 and an acceleration capacity adjustment instruction, and the acceleration capacity adjustment instruction carries an acceleration capacity allocation instruction and IPSec_3DES_1 Gbps and is used to request the accelerator controller to allocate an acceleration capacity "IPSec_3DES_1 Gbps" to the VM 1.

(2) After receiving the acceleration capacity adjustment request, the accelerator controller determines an accelerator agent based on the VM 1, and sends the acceleration capacity adjustment request to the accelerator agent.

(3) The accelerator agent determines, based on the received acceleration capacity adjustment request, a virtual machine corresponding to the virtual machine identifier, determines that a target virtual accelerator device is a vAcc 1, where configuration information of the vAcc 1 is IPSec_3DES_2 Gbps, reconfigures the configuration information of the vAcc 1 as "IPSec_3DES_3 Gbps" according to the acceleration capacity adjustment instruction, and returns a configuration result indication to the accelerator controller.

The returning step is not shown in FIG. 8.

(4) An app in the VM 1 can directly use the vAcc 1, with no need to restart the VM 1.

The following separately describes an acceleration capacity allocation process and an acceleration capacity releasing process in detail with reference to the accompanying drawings.

Figure 9:
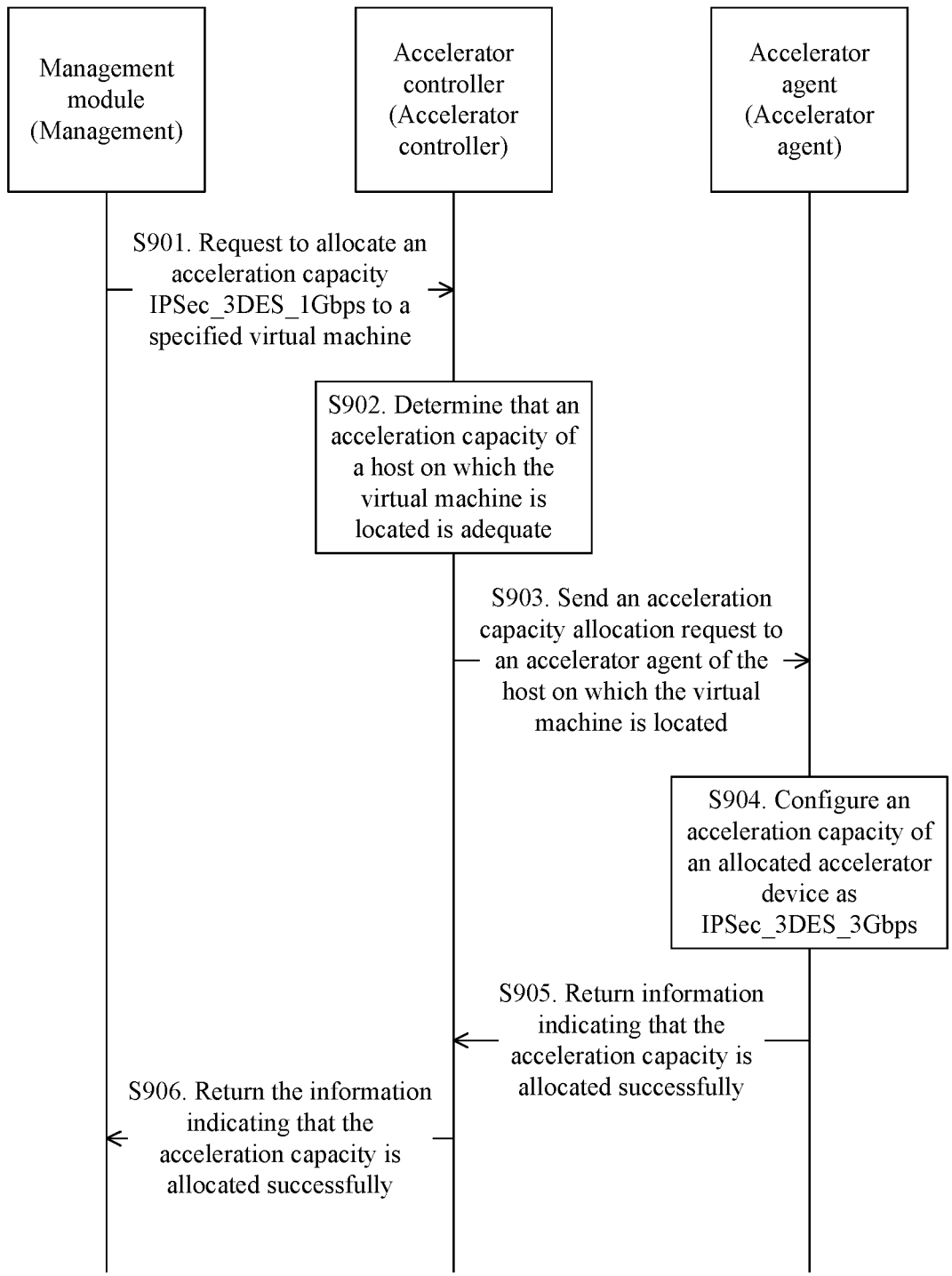
FIG. 9 is a sequence diagram of an acceleration capacity allocation process according to an embodiment of this application.

As shown in FIG. 9, it is assumed that only one accelerator device is allocated to a specified virtual machine and configuration information of the accelerator device is IPSec_3DES_2 Gbps. A specific procedure for allocating an acceleration capacity to the accelerator device is as follows.

S901. A management requests an accelerator controller to allocate an acceleration capacity IPSec_3DES_1 Gbps to the specified virtual machine.

S902. The accelerator controller determines that an acceleration capacity of a host on which the virtual machine is located is adequate, namely, determines whether the acceleration capacity IPSec_3DES_1 Gbps can be allocated.

S903. The accelerator controller sends an acceleration capacity allocation request to an accelerator agent of the host on which the virtual machine is located.

The acceleration capacity allocation request carries IPSec_3DES_1 Gbps.

S904. The accelerator agent configures an acceleration capacity of the allocated accelerator device as IPSec_3DES_3 Gbps.

S905. The accelerator agent returns, to the accelerator controller, information indicating that the acceleration capacity is allocated successfully.

S906. The accelerator controller returns, to the management, the information indicating that the acceleration capacity is allocated successfully.

Figure 10:
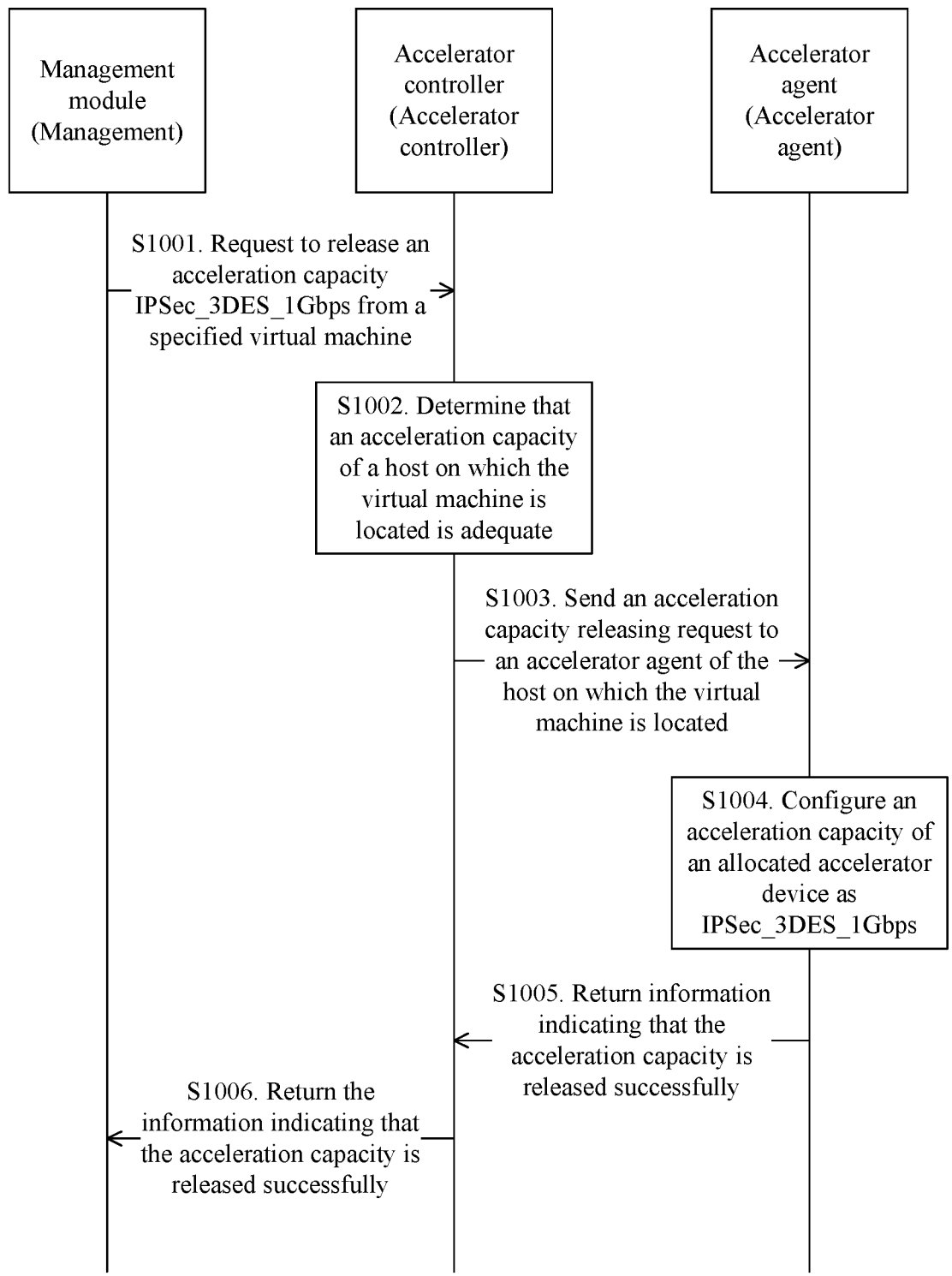
FIG. 10 is a sequence diagram of an acceleration capacity releasing process according to an embodiment of this application.

As shown in FIG. 10, it is assumed that only one accelerator device is allocated to a specified virtual machine and configuration information of the accelerator device is IPSec_3DES_2 Gbps. A specific procedure for allocating an acceleration capacity to the accelerator device is as follows.

S1001. A management requests an accelerator controller to release an acceleration capacity IPSec_3DES_1 Gbps from the specified virtual machine.

S1002. The accelerator controller determines that an acceleration capacity of a host on which the virtual machine is located is adequate, namely, determines whether the acceleration capacity IPSec_3DES_1 Gbps can be released.

S1003. The accelerator controller sends an acceleration capacity releasing request to an accelerator agent of the host on which the virtual machine is located.

The acceleration capacity releasing request carries IPSec_3DES_1Gbps.

S1004. The accelerator agent configures an acceleration capacity of the allocated accelerator device as IPSec_3DES_1 Gbps.

S1005. The accelerator agent returns, to the accelerator controller, information indicating that the acceleration capacity is released successfully.

S1006. The accelerator controller returns, to the management, the information indicating that the acceleration capacity is released successfully.

Figure 11:
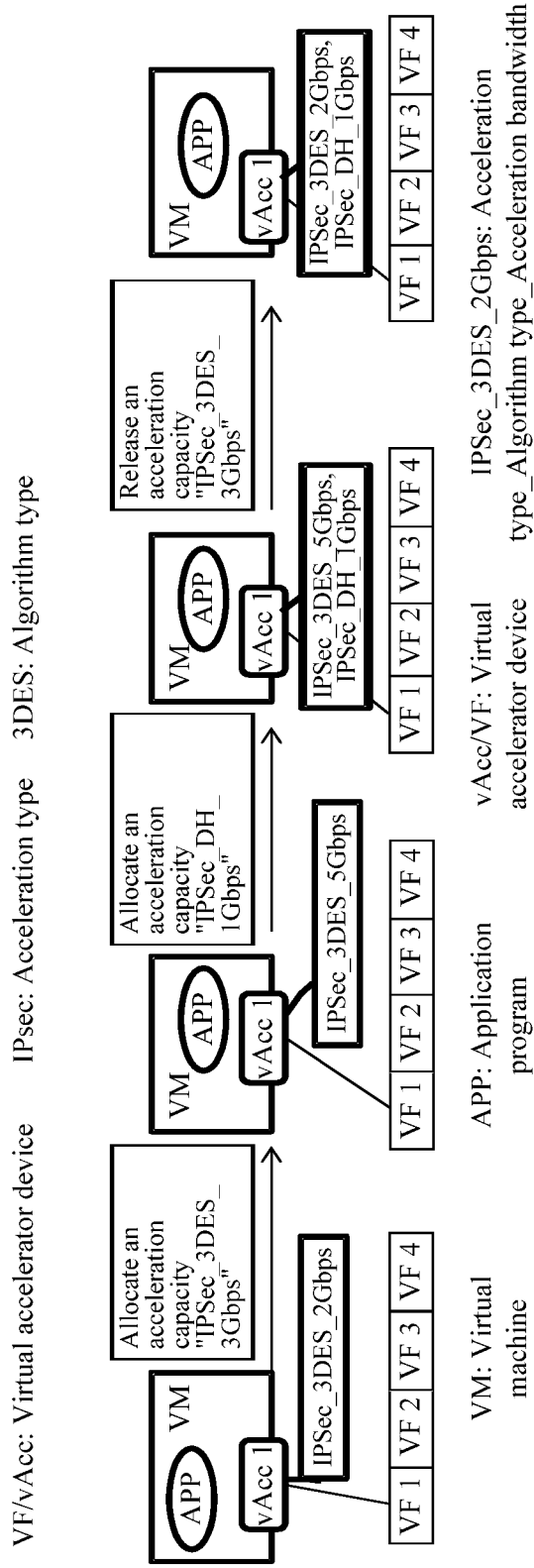
FIG. 11 is a schematic diagram of adjusting an acceleration capacity a plurality of times according to an embodiment of this application.

For another example, as shown in FIG. 11, a virtual accelerator device that has been allocated by a host to a VM is a vAcc 1, and configuration information of the vAcc 1 is IPSec_3DES_2 Gbps. An accelerator agent receives an acceleration capacity adjustment request sent by an accelerator controller, where the acceleration capacity adjustment request carries an identifier of the VM and an acceleration capacity adjustment instruction, and the acceleration capacity adjustment instruction is an acceleration capacity allocation instruction and IPSec_3DES_3 Gbps, determines the vAcc 1 as a target virtual accelerator device, and configures the configuration information of the vAcc 1 as IPSec_3DES_5 Gbps. Further, the accelerator agent receives an acceleration capacity adjustment request sent by the accelerator controller, where the acceleration capacity adjustment request carries the identifier of the VM and an acceleration capacity adjustment instruction, and the acceleration capacity adjustment instruction is an acceleration capacity allocation instruction and IPSec_DHiGbps, determines the vAcc 1 as the target virtual accelerator device, and configures the configuration information of the vAcc 1 as IPSec_3DES_5 Gbps and IPSec_DHiGbps. Further, the accelerator agent receives an acceleration capacity adjustment request sent by the accelerator controller, where the acceleration capacity adjustment request carries the identifier of the VM and an acceleration capacity adjustment instruction, and the acceleration capacity adjustment instruction is an acceleration capacity releasing instruction and IPSec_3DES_3 Gbps, determines the vAcc 1 as the target virtual accelerator device, and configures the configuration information of the vAcc 1 as IPSec_3DES_2 Gbps and IPSec_DHiGbps.

Therefore, according to the method provided in this embodiment of this application, when acceleration capacity scaling is implemented based on an acceleration capacity granularity, a quantity of PCI accelerator devices remains unchanged, and a newly-allocated acceleration capacity or a released acceleration capacity can take effect without restarting the virtual machine, thereby avoiding service interruption. In addition, acceleration capacity scaling is implemented based on a PCI accelerator device granularity, and a granularity change means only allocation/releasing of an accelerator device. However, the app may appeal for changing a part of an acceleration capacity of a PCI accelerator device, and consequently a part of the acceleration capacity becomes redundant, which is equivalent to generating an ineffective resource fragment. According to the method provided in this embodiment of this application, the foregoing problem does not arise, thereby improving bandwidth resource utilization. Further, compared with acceleration capacity scaling implemented based on the PCI accelerator device granularity in which accelerator device scheduling overheads need to be increased when the app uses a plurality of accelerator devices, according to the method in which scaling is implemented based on the acceleration capacity granularity in this embodiment of this application, the app needs to use only one accelerator device without scheduling an accelerator device, thereby reducing complexity and signaling overheads.

Based on a same idea as the embodiment shown in FIG. 6, an embodiment of this application provides an acceleration capacity adjustment apparatus for adjusting an acceleration capacity of a virtual machine. Details are not described herein again.

Figure 12:
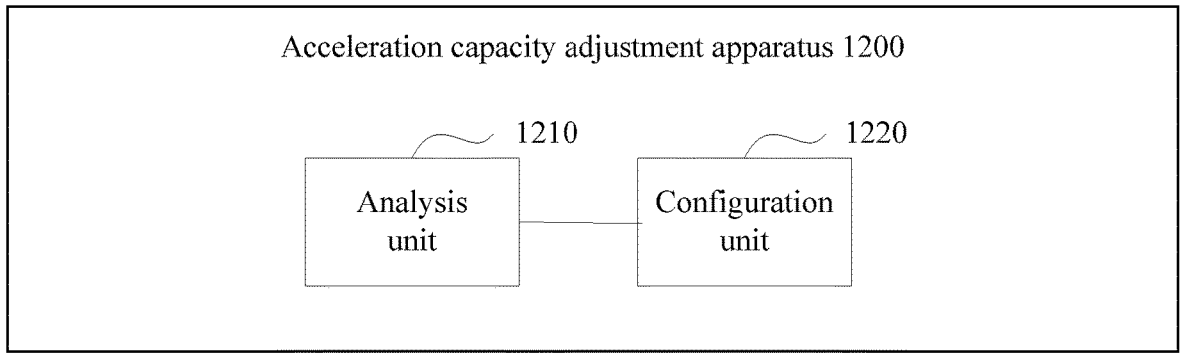
FIG. 12 is a first schematic structural diagram of an acceleration capacity adjustment apparatus according to an embodiment of this application.

As shown in FIG. 12, the apparatus 1200 includes an analysis unit 1210, configured to determine a to-be-adjusted virtual machine and an acceleration capacity requirement of the to-be-adjusted virtual machine, and a configuration unit 1220, configured to reconfigure, based on the to-be-adjusted virtual machine and the acceleration capacity requirement, an acceleration capacity of at least one virtual accelerator device that has been allocated to the to-be-adjusted virtual machine.

In a possible implementation, the configuration unit 1220 is configured to determine a to-be-adjusted virtual accelerator device, where the to-be-adjusted virtual accelerator device is the at least one virtual accelerator device that has been allocated to the to-be-adjusted virtual machine, and reconfigure the to-be-adjusted virtual accelerator device based on the acceleration capacity requirement, so that a reconfigured acceleration capacity of the to-be-adjusted virtual machine meets the acceleration capacity requirement.

In a possible implementation, the analysis unit 1210 is configured to determine the to-be-adjusted virtual machine and the acceleration capacity requirement of the to-be-adjusted virtual machine based on a load status of the virtual machine.

In a possible implementation, the analysis unit 1210 is configured to determine the to-be-adjusted virtual machine and the acceleration capacity requirement of the to-be-adjusted virtual machine based on an allocated task of the virtual machine, and when the acceleration capacity of the virtual machine cannot satisfy an acceleration requirement of the allocated task, determine that the virtual machine is the to-be-adjusted virtual machine, and that the acceleration capacity requirement of the to-be-adjusted virtual machine is an acceleration capacity that can satisfy the acceleration requirement of the allocated task.

Based on a same idea as the embodiment shown in FIG. 7, an embodiment of this application provides an acceleration capacity adjustment apparatus for adjusting an acceleration capacity of a virtual machine. Details are not described herein again.

Figure 13:
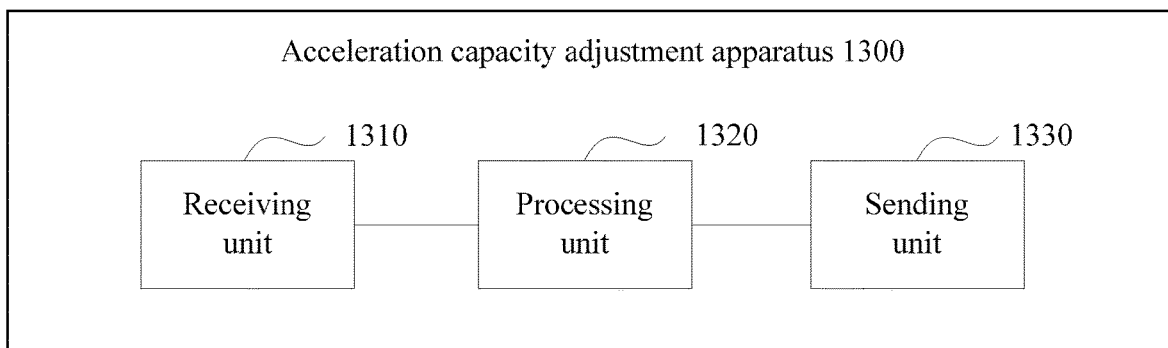
FIG. 13 is a second schematic structural diagram of an acceleration capacity adjustment apparatus according to an embodiment of this application.

As shown in FIG. 13, the apparatus 1300 includes a receiving unit 1310, configured to receive an acceleration capacity adjustment request, where the acceleration capacity adjustment request carries a virtual machine identifier and an acceleration capacity adjustment instruction, and a processing unit 1320, configured to determine a virtual machine corresponding to the virtual machine identifier, and configure, according to the acceleration capacity adjustment instruction, a virtual accelerator device that has been allocated to the virtual machine.

In a possible implementation, the acceleration capacity adjustment instruction carries an acceleration capacity allocation instruction, a first acceleration type, a first algorithm type, and a first acceleration capacity value, and the acceleration capacity allocation instruction is used to instruct the accelerator agent to allocate an acceleration capacity to the virtual accelerator device that has been allocated to the virtual machine.

The processing unit 1320 is configured to, when configuring, according to the acceleration capacity adjustment instruction, the virtual accelerator device that has been allocated to the virtual machine, use, as a target virtual accelerator device, any virtual accelerator device that has been allocated to the virtual machine, and if first target configuration information exists in configuration information of the target virtual accelerator device, reconfigure an acceleration capacity value in the first target configuration information as a sum of an original acceleration capacity value and the first acceleration capacity value, or if the accelerator agent determines that no first target configuration information exists in configuration information of the target virtual accelerator device, add new configuration information to the target virtual accelerator device, where the newly-added configuration information includes the first acceleration type, the first algorithm type, and the first acceleration capacity value, and in the first target configuration information, an acceleration type is the same as the first acceleration type, and an algorithm type is the same as the first algorithm type.

In a possible implementation, the acceleration capacity adjustment instruction carries an acceleration capacity releasing instruction, a second acceleration type, a second algorithm type, and a second acceleration capacity value, and the acceleration capacity releasing instruction is used to instruct the accelerator agent to release an acceleration capacity from the virtual accelerator device that has been allocated to the virtual machine.

The processing unit 1320 is configured to, when configuring, according to the acceleration capacity adjustment instruction, the virtual accelerator device that has been allocated to the virtual machine, use, as a target virtual accelerator device, any virtual accelerator device that has second target configuration information in the virtual accelerator device that has been allocated to the virtual machine, where in the second target configuration information, an acceleration type is the same as the second acceleration type, an algorithm type is the same as the second algorithm type, and an acceleration capacity value is greater than the second acceleration capacity value, and reconfigure the acceleration capacity value in the second target configuration information of the target virtual accelerator device as a difference between an original acceleration capacity value and the second acceleration capacity value.

In a possible implementation, the apparatus further includes a sending unit 1330, configured to, after the virtual accelerator device that has been allocated to the virtual machine is configured according to the acceleration capacity adjustment instruction, feed back a configuration result indication, where the configuration result indication is used to notify whether the acceleration capacity adjustment request is completed.

Based on a same idea as the embodiment shown in FIG. 6, an embodiment of the present disclosure provides a physical host. Details are not described herein again. As shown in FIG. 2, the physical host includes a hardware layer including at least one physical accelerator device, a host machine running on the hardware layer, and at least one virtual machine and at least one virtual accelerator device that run on the host. The virtual accelerator device provides an acceleration capacity for the virtual machine based on the physical accelerator device.

The host is configured to determine a to-be-adjusted virtual machine and an acceleration capacity requirement of the to-be-adjusted virtual machine, and reconfigure, based on the to-be-adjusted virtual machine and the acceleration capacity requirement, an acceleration capacity of at least one virtual accelerator device that has been allocated to the to-be-adjusted virtual machine.

In a possible implementation, the host is configured to, when reconfiguring the acceleration capacity of the at least one virtual accelerator device that has been allocated to the to-be-adjusted virtual machine, determine a to-be-adjusted virtual accelerator device, where the to-be-adjusted virtual accelerator device is the at least one virtual accelerator device that has been allocated to the to-be-adjusted virtual machine, and reconfigure the to-be-adjusted virtual accelerator device based on the acceleration capacity requirement, so that a reconfigured acceleration capacity of the to-be-adjusted virtual machine meets the acceleration capacity requirement.

In a possible implementation, the host is configured to, when determining the to-be-adjusted virtual machine and the acceleration capacity requirement of the to-be-adjusted virtual machine, determine the to-be-adjusted virtual machine and the acceleration capacity requirement of the to-be-adjusted virtual machine based on a load status of the virtual machine.

In a possible implementation, the host is configured to, when determining the to-be-adjusted virtual machine and the acceleration capacity requirement of the to-be-adjusted virtual machine, determine the to-be-adjusted virtual machine and the acceleration capacity requirement of the to-be-adjusted virtual machine based on an allocated task of the virtual machine, and when the acceleration capacity of the virtual machine cannot satisfy an acceleration requirement of the allocated task, determine that the virtual machine is the to-be-adjusted virtual machine, and that the acceleration capacity requirement of the to-be-adjusted virtual machine is an acceleration capacity that can satisfy the acceleration requirement of the allocated task.

Based on a same idea as the embodiment shown in FIG. 6, an embodiment of the present disclosure provides a physical host. Details are not described herein again. As shown in FIG. 2, an embodiment of the present disclosure provides a physical host. The physical host includes a hardware layer including at least one physical accelerator device, a host machine running on the hardware layer, and at least one virtual machine and at least one virtual accelerator device that run on the host. The virtual accelerator device provides an acceleration capacity for the virtual machine based on the physical accelerator device.

The host is configured to receive an acceleration capacity adjustment request, where the acceleration capacity adjustment request carries a virtual machine identifier and an acceleration capacity adjustment instruction, and determine a virtual machine corresponding to the virtual machine identifier, and configure, according to the acceleration capacity adjustment instruction, a virtual accelerator device that has been allocated to the virtual machine.

In a possible implementation, the acceleration capacity adjustment instruction carries an acceleration capacity allocation instruction, a first acceleration type, a first algorithm type, and a first acceleration capacity value, and the acceleration capacity allocation instruction is used to instruct the accelerator agent to allocate an acceleration capacity to the virtual accelerator device that has been allocated to the virtual machine.

The host is configured to, when configuring, according to the acceleration capacity adjustment instruction, the virtual accelerator device that has been allocated to the virtual machine, use, as a target virtual accelerator device, any virtual accelerator device that has been allocated to the virtual machine, and if first target configuration information exists in configuration information of the target virtual accelerator device, reconfigure an acceleration capacity value in the first target configuration information as a sum of an original acceleration capacity value and the first acceleration capacity value, or if it is determined that no first target configuration information exists in configuration information of the target virtual accelerator device, add new configuration information to the target virtual accelerator device, where the newly-added configuration information includes the first acceleration type, the first algorithm type, and the first acceleration capacity value, and in the first target configuration information, an acceleration type is the same as the first acceleration type, and an algorithm type is the same as the first algorithm type.

In a possible implementation, the acceleration capacity adjustment instruction carries an acceleration capacity releasing instruction, a second acceleration type, a second algorithm type, and a second acceleration capacity value, and the acceleration capacity releasing instruction is used to instruct the accelerator agent to release an acceleration capacity from the virtual accelerator device that has been allocated to the virtual machine.

The host is configured to, when configuring, according to the acceleration capacity adjustment instruction, the virtual accelerator device that has been allocated to the virtual machine, use, as a target virtual accelerator device, any virtual accelerator device that has second target configuration information in the virtual accelerator device that has been allocated to the virtual machine, where in the second target configuration information, an acceleration type is the same as the second acceleration type, an algorithm type is the same as the second algorithm type, and an acceleration capacity value is greater than the second acceleration capacity value, and reconfigure the acceleration capacity value in the second target configuration information of the target virtual accelerator device as a difference between an original acceleration capacity value and the second acceleration capacity value.

In a possible implementation, the host is configured to, after configuring, according to the acceleration capacity adjustment instruction, the virtual accelerator device that has been allocated to the virtual machine, feed back a configuration result indication, where the configuration result indication is used to notify whether the acceleration capacity adjustment request is completed.

To sum up, according to the method provided in the embodiments of this application, the to-be-adjusted virtual machine and the acceleration capacity requirement of the to-be-adjusted virtual machine are determined, and then the acceleration capacity of the at least one virtual accelerator device that has been allocated to the to-be-adjusted virtual machine is reconfigured based on the to-be-adjusted virtual machine and the acceleration capacity requirement. Therefore, according to the method provided in the embodiments of this application, acceleration capacity scaling is implemented based on the acceleration capacity granularity, the quantity of PCI accelerator devices remains unchanged, and the newly-allocated acceleration capacity or the released acceleration capacity can take effect without restarting the virtual machine, thereby avoiding service interruption. In addition, acceleration capacity scaling is implemented based on the PCI accelerator device granularity, and the granularity change means only allocation/releasing of the accelerator device. However, the app may appeal for changing a part of an acceleration capacity of a PCI accelerator device, and consequently a part of the acceleration capacity becomes redundant, which is equivalent to generating the ineffective resource fragment. According to the method provided in the embodiments of this application, the foregoing problem does not arise, and the bandwidth resource utilization can be effectively improved. Further, compared with acceleration capacity scaling implemented based on the PCI accelerator device granularity in which accelerator device scheduling overheads need to be increased when the app uses a plurality of accelerator devices, according to the method in which scaling is implemented based on the acceleration capacity granularity, the app needs to use only one accelerator device in the embodiments of this application without scheduling an accelerator device, thereby reducing implementation complexity and the signaling overheads.

A person skilled in the art should understand that the embodiments of this application may be provided as a method, a system, or a computer program product. Therefore, this application may use a form of a hardware-only embodiment, a software-only embodiment, or an embodiment combining software and hardware. Moreover, this application may use a form of a computer program product that is implemented on one or more computer-usable storage media (including but not limited to a magnetic disk storage, a compact disc read only memory (CD-ROM), an optical memory, and the like) that include computer-usable program code.

This application is described with reference to the flowcharts and/or block diagrams of the method, the device (system), and the computer program product according to the embodiments of this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of another programmable data processing device to generate a machine, so that the instructions executed by the computer or the processor of another programmable data processing device generate an apparatus for implementing a specified function in one or more processes in the flowcharts and/or in one or more blocks in the block diagrams.

These computer program instructions may be alternatively stored in a computer readable memory that can instruct a computer or another programmable data processing device to work in a specific manner, so that the instructions stored in the computer readable memory generate an artifact that includes an instruction apparatus. The instruction apparatus implements a specified function in one or more processes in the flowcharts and/or in one or more blocks in the block diagrams.

These computer program instructions may be alternatively loaded onto a computer or another programmable data processing device, so that a series of operations and steps are performed on the computer or the another programmable device, thereby generating computer-implemented processing. Therefore, the instructions executed on the computer or the another programmable device provide steps for implementing a specified function in one or more processes in the flowcharts and/or in one or more blocks in the block diagrams.

Although the embodiments of this application have been described, a person skilled in the art can make changes and modifications to these embodiments once they learn the basic inventive concept. Therefore, the following claims are intended to be construed as covering the embodiments of this application and all changes and modifications falling within the scope of this application.

Obviously, a person skilled in the art may make various modifications and variations to the embodiments of this application without departing from the spirit and scope of the embodiments of this application. This application is intended to cover these modifications and variations of the embodiments of this application, provided that these changes and variations fall within the scope of the claims of this application and equivalent technologies thereof.

What is claimed is:

1. An acceleration capacity adjustment method comprising:
    determining a to-be-adjusted virtual machine and an acceleration capacity requirement of the to-be-adjusted virtual machine based on an acceleration capacity allocation request;
    reconfiguring an acceleration capacity of a virtual accelerator device that has been allocated to the to-be-adjusted virtual machine based on the acceleration capacity requirement to adjust an acceleration capacity of the to-be-adjusted virtual machine, wherein the acceleration capacity requirement comprises a first acceleration type, a first algorithm type, and a first acceleration capacity value;
    reconfiguring a second acceleration capacity value in target configuration information when the target configuration information exists in configuration information of the virtual accelerator device; and
    adding new target configuration information to the virtual accelerator device when target configuration information does not exist in configuration information of the virtual accelerator device,
    wherein the new target configuration information comprises the first acceleration type, the first algorithm type, and the first acceleration capacity value of the acceleration capacity requirement.

2. The acceleration capacity adjustment method of claim 1, further comprising reconfiguring the virtual accelerator device based on the acceleration capacity requirement, wherein the acceleration capacity of the to-be-adjusted virtual machine after reconfiguration meets the acceleration capacity requirement.

3. The acceleration capacity adjustment method of claim 1, wherein the to-be-adjusted virtual machine and the acceleration capacity requirement of the to-be-adjusted virtual machine are determined based on a load status of the to-be-adjusted virtual machine.

4. The acceleration capacity adjustment method of claim 1, wherein the to-be-adjusted virtual machine and the acceleration capacity requirement of the to-be-adjusted virtual machine are determined based on an allocated task of the to-be-adjusted virtual machine, and wherein the acceleration capacity adjustment method further comprises determining that the acceleration capacity requirement of the to-be-adjusted virtual machine is an acceleration capacity that satisfies the acceleration capacity requirement of the allocated task in response to the acceleration capacity of the to-be-adjusted virtual machine failing to satisfy an acceleration requirement of the allocated task.

5. An acceleration capacity adjustment method performed by an accelerator agent, comprising:
    receiving an acceleration capacity adjustment request carrying a virtual machine identifier and an acceleration capacity adjustment instruction;
    determining a virtual machine corresponding to the virtual machine identifier; and
    configuring a virtual accelerator device that has been allocated to the virtual machine according to the acceleration capacity adjustment instruction,
    wherein the acceleration capacity adjustment instruction carries an acceleration capacity allocation instruction, a first acceleration type, a first algorithm type, and a first acceleration capacity value, and
    wherein the acceleration capacity allocation instruction instructs the accelerator agent to allocate an acceleration capacity to the virtual accelerator device that has been allocated to the virtual machine.

6. The acceleration capacity adjustment method of claim 5, further comprising:
    using, as a target virtual accelerator device, any virtual accelerator device that has been allocated to the virtual machine; and
    reconfiguring an acceleration capacity value in first target configuration information as a sum of an original acceleration capacity value and the first acceleration capacity value in response to the first target configuration information existing in configuration information of the target virtual accelerator device, and wherein the first target configuration information comprises the first acceleration type and the first algorithm type.

7. The acceleration capacity adjustment method of claim 5, wherein the acceleration capacity adjustment instruction carries an acceleration capacity releasing instruction, a second acceleration type, a second algorithm type, and a second acceleration capacity value, wherein the acceleration capacity releasing instruction instructs the accelerator agent to release a second acceleration capacity from the virtual accelerator device that has been allocated to the virtual machine, and wherein the acceleration capacity adjustment method further comprises:
　　using any virtual accelerator device that has second target configuration information in the virtual accelerator device that has been allocated to the virtual machine as a target virtual accelerator device, wherein in the second target configuration information, an acceleration type is the same as the second acceleration type, an algorithm type is the same as the second algorithm type, and an acceleration capacity value is greater than the second acceleration capacity value; and
　　reconfiguring the acceleration capacity value in the second target configuration information of the target virtual accelerator device as a difference between an original acceleration capacity value and the second acceleration capacity value.

8. The acceleration capacity adjustment method of claim 5, wherein after configuring the virtual accelerator device that has been allocated to the virtual machine, the acceleration capacity adjustment method further comprises feeding back a configuration result indication notifying whether the acceleration capacity adjustment request has been successfully completed.

9. A physical host, comprising:
　　a memory comprising instructions; and
　　a processor coupled to the memory and configured to execute the instructions, which cause the processor to be configured to:
　　　　determine a to-be-adjusted virtual machine and an acceleration capacity requirement of the to-be-adjusted virtual machine based on an acceleration capacity allocation request;
　　　　reconfigure an acceleration capacity of a virtual accelerator device that has been allocated to the to-be-adjusted virtual machine based on the to-be-adjusted virtual machine and the acceleration capacity requirement, wherein the acceleration capacity requirement comprises a first acceleration type, a first algorithm type, and a first acceleration capacity value;
　　　　reconfigure a second acceleration capacity value in target configuration information when the target configuration information exists in configuration information of the virtual accelerator device; and
　　　　add new target configuration information to the virtual accelerator device when no target configuration information exists in configuration information of the virtual accelerator device,
　　　　wherein the new target configuration information comprises the first acceleration type, the first algorithm type, and the first acceleration capacity value of the acceleration capacity requirement.

10. The physical host of claim 9, wherein the instructions further cause the processor to be configured to:
　　determine the virtual accelerator device that has been allocated to the to-be-adjusted virtual machine; and
　　reconfigure the virtual accelerator device based on the acceleration capacity requirement, wherein the acceleration capacity of the to-be-adjusted virtual machine after reconfiguration meets the acceleration capacity requirement.

11. The physical host of claim 9, wherein the to-be-adjusted virtual machine and the acceleration capacity requirement of the to-be-adjusted virtual machine are determined based on a load status of the to-be-adjusted virtual machine.

12. The physical host of claim 9, wherein the to-be-adjusted virtual machine and the acceleration capacity requirement of the to-be-adjusted virtual machine are determined based on an allocated task of the to-be-adjusted virtual machine, and wherein the instructions further cause the processor to be configured to determine that the acceleration capacity requirement of the to-be-adjusted virtual machine is an acceleration capacity that satisfies the acceleration capacity requirement of the allocated task in response to the acceleration capacity of the to-be-adjusted virtual machine failing to satisfy an acceleration requirement of the allocated task.

13. A physical host, comprising:
　　a memory comprising instructions; and
　　a processor coupled to the memory and configured to execute the instructions, which cause the processor to be configured to:
　　　　receive an acceleration capacity adjustment request carrying a virtual machine identifier and an acceleration capacity adjustment instruction;
　　　　determine a virtual machine corresponding to the virtual machine identifier; and
　　　　configure a virtual accelerator device that has been allocated to the virtual machine according to the acceleration capacity adjustment instruction,
　　　　wherein the acceleration capacity adjustment instruction carries an acceleration capacity allocation instruction, a first acceleration type, a first algorithm type, and a first acceleration capacity value, and
　　　　wherein the acceleration capacity allocation instruction instructs the physical host to allocate an acceleration capacity to the virtual accelerator device that has been allocated to the virtual machine.

14. The physical host of claim 13, wherein the instructions further cause the processor to be configured to:
　　use, as a target virtual accelerator device, any virtual accelerator device that has been allocated to the virtual machine; and
　　reconfigure an acceleration capacity value in first target configuration information as a sum of an original acceleration capacity value and the first acceleration capacity value in response to the first target configuration information existing in configuration information of the target virtual accelerator device, and wherein, in the first target configuration information, an acceleration type is the same as the first acceleration type, and an algorithm type is the same as the first algorithm type.

15. The physical host of claim 13, wherein the acceleration capacity adjustment instruction carries an acceleration capacity releasing instruction, a second acceleration type, a second algorithm type, and a second acceleration capacity value, wherein the acceleration capacity releasing instruction instructs the physical host to release an acceleration capacity from the virtual accelerator device that has been allocated to the virtual machine, and wherein the instructions further cause the processor to be configured to:

use, as a target virtual accelerator device, any virtual accelerator device that has second target configuration information in the virtual accelerator device that has been allocated to the virtual machine, wherein in the second target configuration information, an acceleration type is the same as the second acceleration type, an algorithm type is the same as the second algorithm type, and an acceleration capacity value is greater than the second acceleration capacity value; and reconfigure the acceleration capacity value in the second target configuration information of the target virtual accelerator device as a difference between an original acceleration capacity value and the second acceleration capacity value.

16. The physical host of claim 13, wherein the instructions further cause the processor to be configured to feed back a configuration result indication notifying whether the acceleration capacity adjustment request has been successfully completed.

17. The acceleration capacity adjustment method of claim 5, further comprising:

using, as a target virtual accelerator device, any virtual accelerator device that has been allocated to the virtual machine; and adding new configuration information to the target virtual accelerator device in response to determining that first target configuration information does not exist in configuration information of the target virtual accelerator device, wherein the new configuration information comprises the first acceleration type, the first algorithm type, and the first acceleration capacity value, and wherein, in the first target configuration information, an acceleration type is the same as the first acceleration type, and an algorithm type is the same as the first algorithm type.

18. The physical host of claim 13, wherein the instructions further cause the processor to be configured to:

use, as a target virtual accelerator device, any virtual accelerator device that has been allocated to the virtual machine; and add new configuration information to the target virtual accelerator device in response to determining that first target configuration information does not exist in configuration information of the target virtual accelerator device, wherein the new configuration information comprises the first acceleration type, the first algorithm type, and the first acceleration capacity value, and wherein, in the first target configuration information, an acceleration type is the same as the first acceleration type, and an algorithm type is the same as the first algorithm type.

19. The acceleration capacity adjustment method of claim 1, wherein the to-be-adjusted virtual machine is determined based on statistics performed on acceleration capacity use statuses of virtual machines in real time.

20. The acceleration capacity adjustment method of claim 5, wherein the virtual machine is determined based on a load of a computing capacity of the virtual machine exceeding a preset threshold.

* * * * *